(12) United States Patent
Veremeev et al.

(10) Patent No.: US 8,098,733 B2
(45) Date of Patent: Jan. 17, 2012

(54) MULTI-DIRECTIONAL MOTION ESTIMATION USING PARALLEL PROCESSORS AND PRE-COMPUTED SEARCH-STRATEGY OFFSET TABLES

(75) Inventors: Dmitry Veremeev, Petah-Tiqua (IL); Gregory Gordon, Tel-Aviv (IL); Roni Lanzet, Kiryat-Ata (IL)

(73) Assignee: NeoMagic Corp., Santa Clara, CA (US)

( * ) Notice: Subject to any disclaimer, the term of this patent is extended or adjusted under 35 U.S.C. 154(b) by 982 days.

(21) Appl. No.: 12/045,277

(22) Filed: Mar. 10, 2008

(65) Prior Publication Data

US 2009/0225845 A1    Sep. 10, 2009

(51) Int. Cl.
*H04N 7/12*    (2006.01)
(52) U.S. Cl. .............................. 375/240.16; 704/240.01
(58) Field of Classification Search .............. 275/240.16
See application file for complete search history.

(56) References Cited

U.S. PATENT DOCUMENTS

| | | | |
|---|---|---|---|
| 5,428,403 A | 6/1995 | Andrew et al. | |
| 5,706,059 A | 1/1998 | Ran et al. | |
| 6,421,698 B1 | 7/2002 | Hong | |
| 6,690,730 B2 | 2/2004 | Choi | |
| 7,072,395 B2 | 7/2006 | Hwang et al. | |
| 7,126,991 B1 * | 10/2006 | Mimar | 375/240.16 |
| 2004/0247029 A1 | 12/2004 | Zhong et al. | |
| 2004/0258154 A1 | 12/2004 | Liu et al. | |
| 2005/0243928 A1 | 11/2005 | Hubrich et al. | |
| 2006/0133641 A1 | 6/2006 | Shimizu et al. | |

OTHER PUBLICATIONS

Joint Video Team (JVT), "Improved and simplified fast motion estimation for JM", Document: JVT-P021, Jul. 2005.
ISO/IEC JTC 1/SC 29/WG 11 N5555, "Draft Text of Final Draft International Standard for Advanced Video Coding", (ITU-T Rec. H.264 | ISO/IEC 14496-10 AVC), Mar. 2003.

* cited by examiner

*Primary Examiner* — Dang Ton
*Assistant Examiner* — Lionel Preval
(74) *Attorney, Agent, or Firm* — Stuart T. Auvinen; gPatent LLC

(57) ABSTRACT

A motion estimator uses many parallel Arithmetic-Logic-Unit (ALU) processors to simultaneously perform searches in many directions from a starting point. Each processor follows a different path outward from the starting point, generating sum-of-absolute differences (SADs) for each point in the path. A best SAD for the path is kept, along with an index into motion vector tables containing X,Y points for all paths. Current and best SAD's, thresholds, and indexes are stored in an ALU dedicated memory. When the number of best SAD's meeting thresholds exceeds a target, the current search-level ends. The index of the overall best SAD locates a new starting point, and a next-denser search-level is performed in the same manner, but over a smaller search area. Each processor calculates SAD's for one 16×16 macroblock, four 8×8 blocks, and 16 4×4 blocks and the net best SAD of these 3 types determines partitioning.

20 Claims, 16 Drawing Sheets

| BLK SIZE | BLK ID | CURRENT SAD | MV TBL INDEX | BEST SAD | MV TBL INDEX | THRESHOLDS | |
|---|---|---|---|---|---|---|---|
| 16X16 | 1,1 | A1 | I1 | B1 | J1 | C1 | |
| 8X8 | 1,2 | A2 | I1 | B2 | J2 | C2 | |
| 8X8 | 1,3 | A3 | I1 | B3 | J3 | C3 | |
| 8X8 (4) | 1,4 | A4 | I1 | B4 | J4 | C4 | |
| 8X8 | 1,5 | A5 | I1 | B5 | J5 | C5 | |
| 4X4 | 1,6 | A6 | I1 | B6 | J6 | C6 | |
| 4X4 (16) | 1,7 | A7 | I1 | B7 | J7 | C7 | |
| • | • | • | • | • | • | • | SECTOR 1, STEP 1 |
| 4X4 | 1,21 | A21 | I1 | B21 | J21 | C21 | |
| 16X16 | 2,1 | A22 | I2 | B22 | J22 | C1 | |
| 8X8 | 2,2 | A23 | I2 | B23 | J23 | C2 | |
| 8X8 | 2,3 | A24 | I2 | B24 | J24 | C3 | |
| 8X8 (4) | 2,4 | A25 | I2 | B25 | J25 | C4 | |
| 8X8 | 2,5 | A26 | I2 | B26 | J26 | C5 | |
| 4X4 | 2,6 | A27 | I2 | B27 | J27 | C6 | |
| 4X4 (16) | 2,7 | A28 | I2 | B28 | J28 | C7 | |
| • | • | • | • | • | • | • | SECTOR 2, STEP 1 |
| 4X4 | 2,21 | A42 | I2 | B42 | J42 | C21 | |
| • | • | • | • | • | • | | |
| 16X16 | 7,1 | A127 | I7 | B127 | J127 | C1 | |
| 8X8 | 7,2 | A128 | I7 | B128 | J128 | C2 | |
| 8X8 | 7,3 | A129 | I7 | B129 | J129 | C3 | |
| 8X8 (4) | 7,4 | A130 | I7 | B130 | J130 | C4 | |
| 8X8 | 7,5 | A131 | I7 | B131 | J131 | C5 | |
| 4X4 | 7,6 | A132 | I7 | B132 | J132 | C6 | |
| 4X4 (16) | 7,7 | A133 | I7 | B133 | J133 | C7 | SECTOR 7, STEP 1 |
| • | • | • | • | • | • | • | |
| 4X4 | 7,21 | A147 | I7 | B147 | J147 | C21 | |
| • | • | • | • | • | • | • | SECTOR K, STEP S |
| 4X4 | K*S,21 | A(K*S*21) | I(K*S) | B(K*S*21) | J(K*S*21) | C21 | |

FIG. 8

MULTI-DIRECTIONAL MOTION ESTIMATION USING PARALLEL PROCESSORS AND PRE-COMPUTED SEARCH-STRATEGY OFFSET TABLES

FIELD OF THE INVENTION

This invention relates to video compression, and more particularly to parallel-search motion estimation.

BACKGROUND OF THE INVENTION

Higher-speed transmission networks have allowed for transmission of large files such as video segments. These video segments are first compressed before transmission to reduce bandwidth requirements. Consequently, video transmission and compression is a fast-growing area of development.

Video data can greatly enhance the quality of a computing or communication experience. The consumer use of the Internet took off once graphics was linked to earlier text-based web pages. Portable consumer devices such as cell phones and personal digital assistant (PDA's) are being equipped with small cameras to allow for capture of still or even video pictures. Televisions shows are being sent over cell phone networks to mobile viewers. Efficient transmission of captured images and video segments over limited-bandwidth links requires some sort of compression of the images.

A number of video-compression techniques are known. Compression standards, such as those developed by the motion-picture-experts group (MPEG), have been widely adopted. These compression techniques are lossy techniques, since some of the picture information is discarded to increase the compression ratio. However, compression ratios of 99% or more have been achieved with minimal noticeable picture degradation.

Next-generation compression standards have been developed for transmitting video over wireless networks. The MPEG-4 standard provides a robust compression technique for transmission over wireless networks. Recovery can occur when parts of the MPEG-4 bit stream is corrupted. Enhancements to the MPEG standard beyond MPEG-4 continue to be made.

These MPEG standards ultimately break the image up into small 16×16 pixel macroblocks or even smaller 8×8 or 4×4 pixel blocks. Each block can then be compressed more or less independently of other blocks, and movement of blocks can be described as highly compressed "motion vectors" rather than large bitmaps of pixels.

FIG. 1 shows an image frame divided into rows and columns of blocks. The MPEG standard uses a divide-and-conquer technique in which the video sequence is divided into individual image frames known as video object planes (VOPs), and each frame is divided into rows and columns of macroblocks. Each macroblock is a rectangle of 16 by 16 pixels.

Various window sizes and image resolutions can be supported by MPEG standards. For example, an image frame may have 352 by 288 pixels. The image frame is divided into 18 rows of 16×16 blocks, with each row having 22 blocks each of 16×16 pixels. A total of 396 blocks are contained in each frame.

The blocks are arranged in a predetermined order, starting in the upper left with the first block (BLK #0). The second block, BLK #1, is to the right of BLK #0 in the first row, followed by blocks #2 to BLK #21 in the first row. The second row contains BLK #22 to BLK #43. The last row contains BLK #374 to BLK #395. Of course, other image sizes and formats can have the blocks in rows of various lengths, and various numbers of rows.

When an image frame is encoded, each block is encoded in macroblock-order, starting with the first macroblock of BLK #0 in the first row, and continuing on until BLK #395.

The blocks are arranged in the bit stream into one or more video packets (VP) with a header. In this example Y values of pixels are shown.

FIG. 2 highlights video compression using a motion vector for a macroblock. When a video stream is compressed prior to transmission, each frame or video object plane (VOP) of the video stream is divided into rectangular regions known as macroblocks. Each macroblock is 16 by 16 pixels in size, so a 160×160 frame has 100 macroblocks.

While some macroblocks in some frames may be encoded simply by transmitting the 256 pixels in each macroblock, or by some other encoding, compression occurs when the same image in a macroblock can be found in 2 or more frames. Since video typically has 2 or more frames per second, movement of image objects is usually slow enough that similar images or macroblocks can be found in several successive frames, although with some movement or change. Rather than re-transmit all 256 pixels in a macroblock, only the changed pixels in the macroblock can be transmitted, along with a motion vector that indicates the movement of the macroblock from frame to frame. The amount of data in the bitstream is reduced since most of the macroblock's pixels are not re-transmitted for each frame.

In FIG. 2, macroblock 16' is a 16×16 pixel region of a first video object plane 10. All 256 pixels in macroblock 16' are transmitted in the bitstream for first video object plane 10. In next video object plane 12, the same image as in macroblock 16' appears, but in a different position in the frame. The same image in macroblock 16 in video object plane 12 is offset from the original location of macroblock 16' in first video object plane 10. The amount and direction of the offset is known as motion vector 20.

Rather than transmit all 256 pixels in macroblock 16, motion vector 20 is encoded into the bitstream. Since one vector replaces up to 256 pixels, a significant amount of data compression occurs. The same image in macroblock 16 may also be found in successive video object planes, and motion vectors can be encoded for these video object planes, further increasing compression.

During compression, a search can be made of all pixels in first VOP 10 within a certain range of the position of macroblock 16. The closest match in first video object plane 10 is selected as macroblock 16' and the difference in location is calculated as motion vector 20. When the image in macroblock 16 differs somewhat from the original image in original macroblock 16', the differences can be encoded and transmitted, allowing macroblock 16 to be generated from original macroblock 16'.

The receiver that receives the encoded bitstream performs decoding rather than encoding. Motion vectors and error terms for each macroblock are extracted from the bitstream and used to move and adjust macroblocks from earlier video object planes in the bitstream. This decoding process is known as motion compensation since the movement of macroblocks is compensated for.

FIG. 3 shows that each macroblock can be divided into 4 smaller blocks. The MPEG-4 standard allows for a finer resolution of motion compensation. A 16×16 macroblock 16 can be further divided into 4 blocks 22, 23, 24, 25. Each block 22, 23, 24, has 8×8, or 64 pixels, which is one-quarter the size of macroblock 16.

FIG. 4 shows that separate motion vectors can be encoded for each of the 4 blocks in a macroblock. When the image in a macroblock remains intact, a single motion vector may be encoded for the entire macroblock. However, when the image itself changes, smaller size blocks can often better match the parts of the image.

A macroblock 16 contains four smaller images in blocks 22, 23, 24, 25. In current video object plane 12, these images occur within a single macroblock 16. However, in the previous or first video object plane 10, these images were separated and have moved by different amounts, so that the images merge together toward one another and now all fit within a single 16×16 pixel area of second video object plane 12. The images of blocks 22, 23, 24, 25 have become less fragmented in second video object plane 12.

During encoding, four motion vectors 26, 27, 28, 29 are separately generated for each of blocks 22, 23, 24, 25 respectively. This allows each block to move by a different amount, whereas when only one motion vector is used for all 4 blocks in a macroblock, all blocks must move by the same amount. In this example, block 25' has shifted more to the left than other blocks 22', 23', 24'. Motion vector 29 is slightly larger than the other motion vectors 26, 27, 28.

Better accuracy can be achieved when block-level motion vectors are used with a macroblock, at the expense of more data (four motion vectors instead of one). Of course, not all macroblocks need to be encoded with four motion vectors, and the encoder can decide when to use block-level motion compensation.

Some newer standards or extensions may allow a 16×16 macroblock to be divided into as many as 16 4×4 blocks. A single macroblock may be encoded as one to sixteen motion vectors. In order to determine the best encoding for a macroblock, an encoder may need to try all possibilities, requiring searches for a total of 21 or more motion vectors for all the 16×16, 8×8, and 4×4 blocks. Then the best combination of motion vectors for encoding the macroblock can be selected.

However, each of the 21 motion vectors needs to be found before the best combination can be determined. Each of the 21 motion vectors requires a search over an area of the frame to locate the best-matching pixels. Each possible search location may require complex calculations such as a sum-of-absolute difference (SAD) of pixel value, and these SAD values have to be compared for each possible location searched. The location with the lowest SAD identifies the best-matching motion vector for that sub-block.

An enormous number of calculations can be required for a good search during motion estimation. Each SAD may require many calculations: subtracting one pixel in the current frame's block from the corresponding pixel in the reference frame's block after translation by the search location (proposed motion vector), taking the absolute value of the difference, then repeating for all pixels in the block, and finally summing all absolute differences to get the SAD. Parallel processing may be used, but ordinary algorithms for motion estimation may not be optimal for use on parallel processors.

What is desired is a parallel processing system that performs motion estimation. A parallel motion estimation procedure is also desired that efficiently searches for and evaluates both macroblock and sub-block motion vectors.

BRIEF DESCRIPTION OF THE DRAWINGS

FIG. 8 shows a table of current and best SAD's stored in the ALU dedicated memory.

DETAILED DESCRIPTION

The present invention relates to an improvement in parallel motion estimation. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
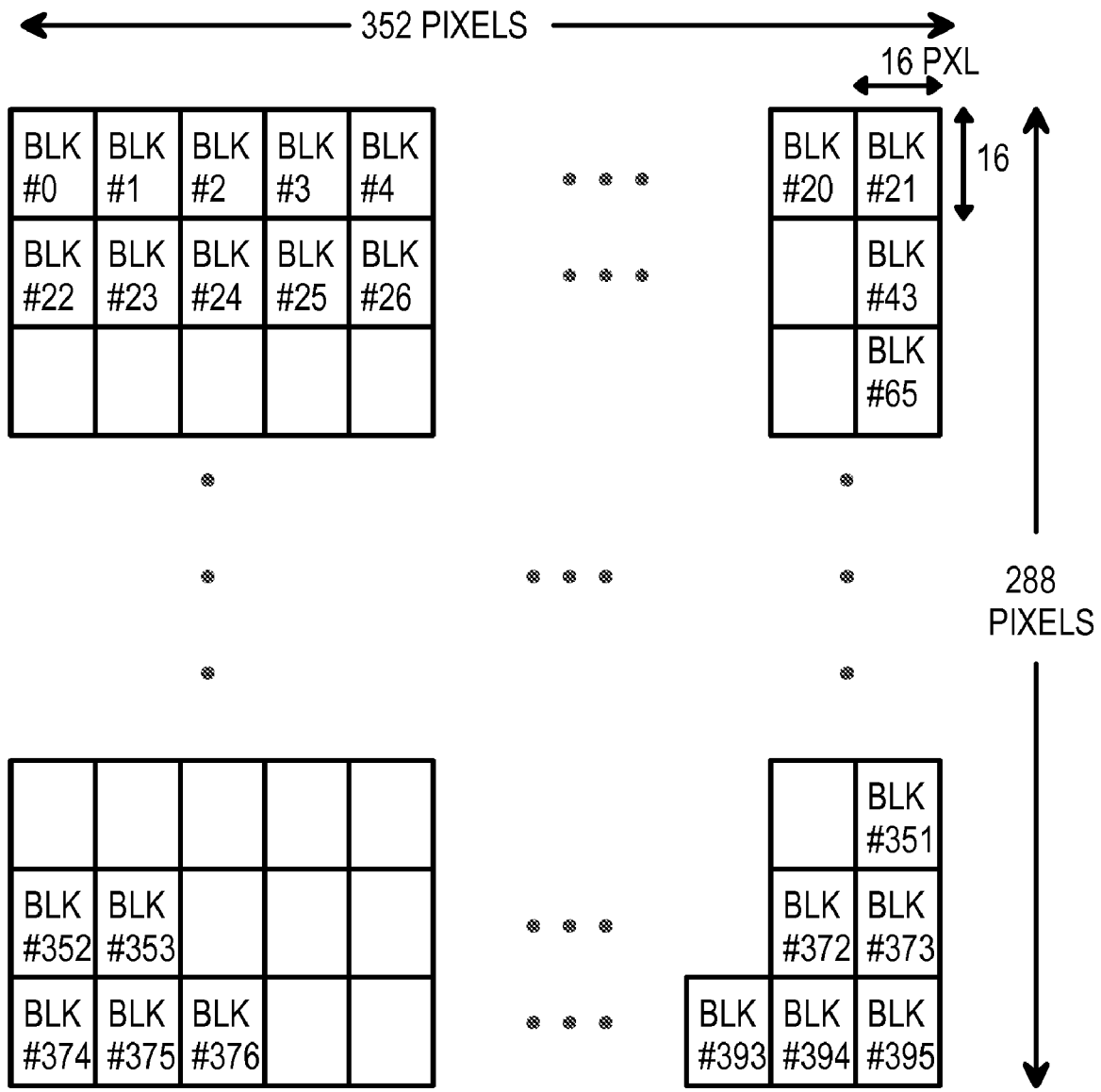
FIG. 1 shows an image frame divided into rows and columns of blocks.
Figure 2:
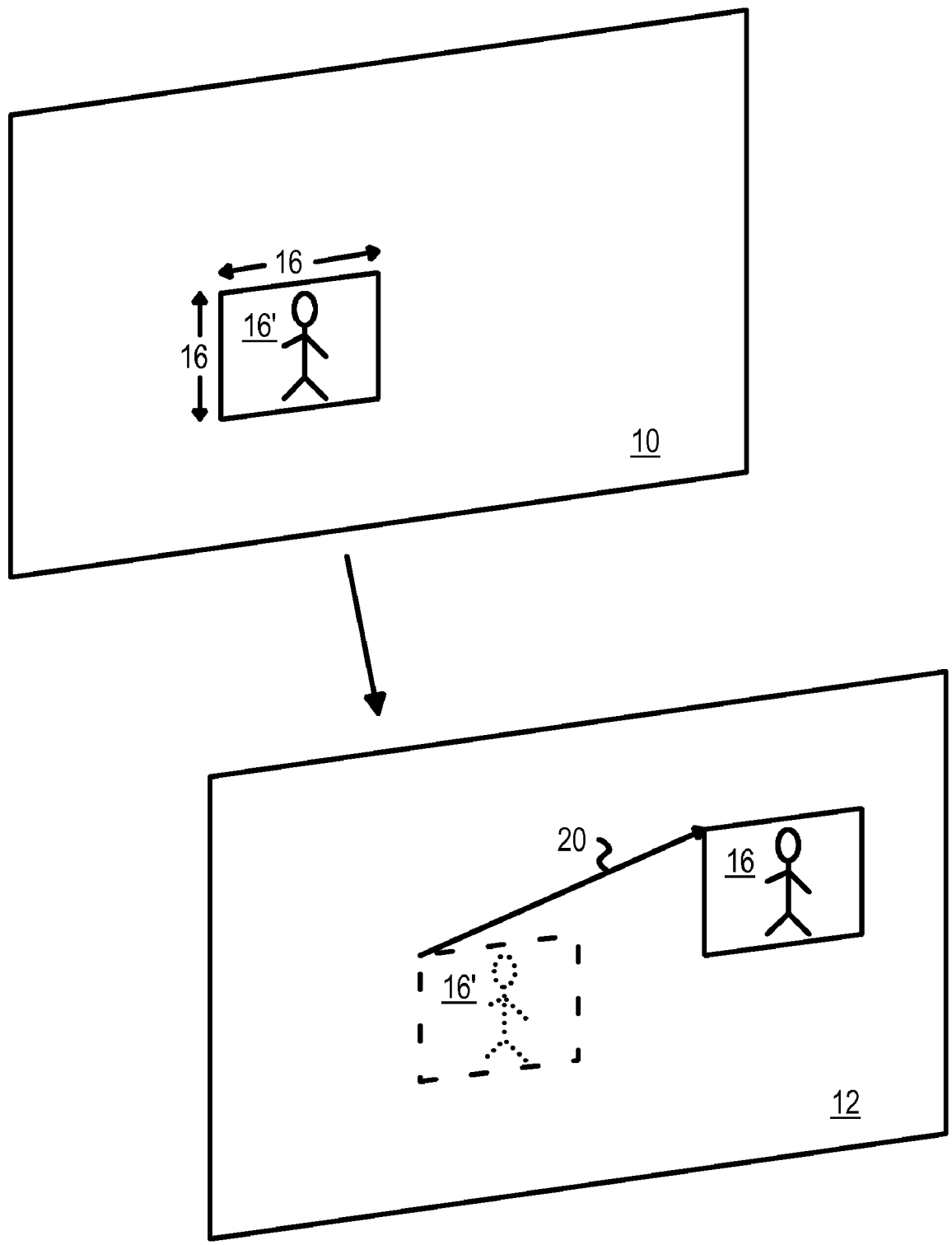
FIG. 2 highlights video compression using a motion vector for a macroblock.
Figure 3:
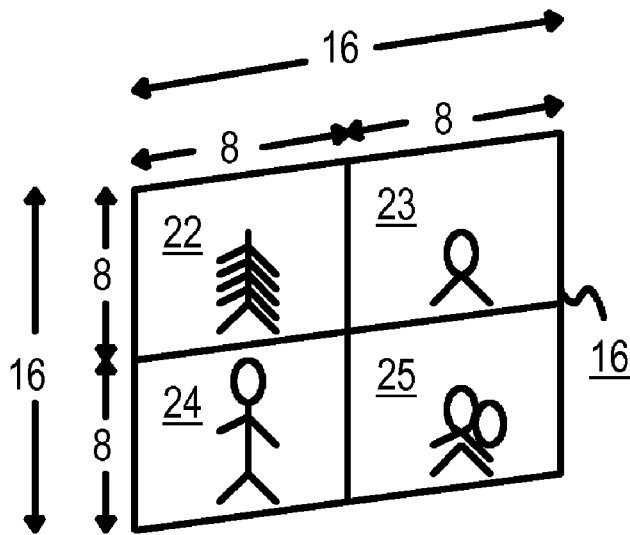
FIG. 3 shows that each macroblock can be divided into 4 smaller blocks.
Figure 4:
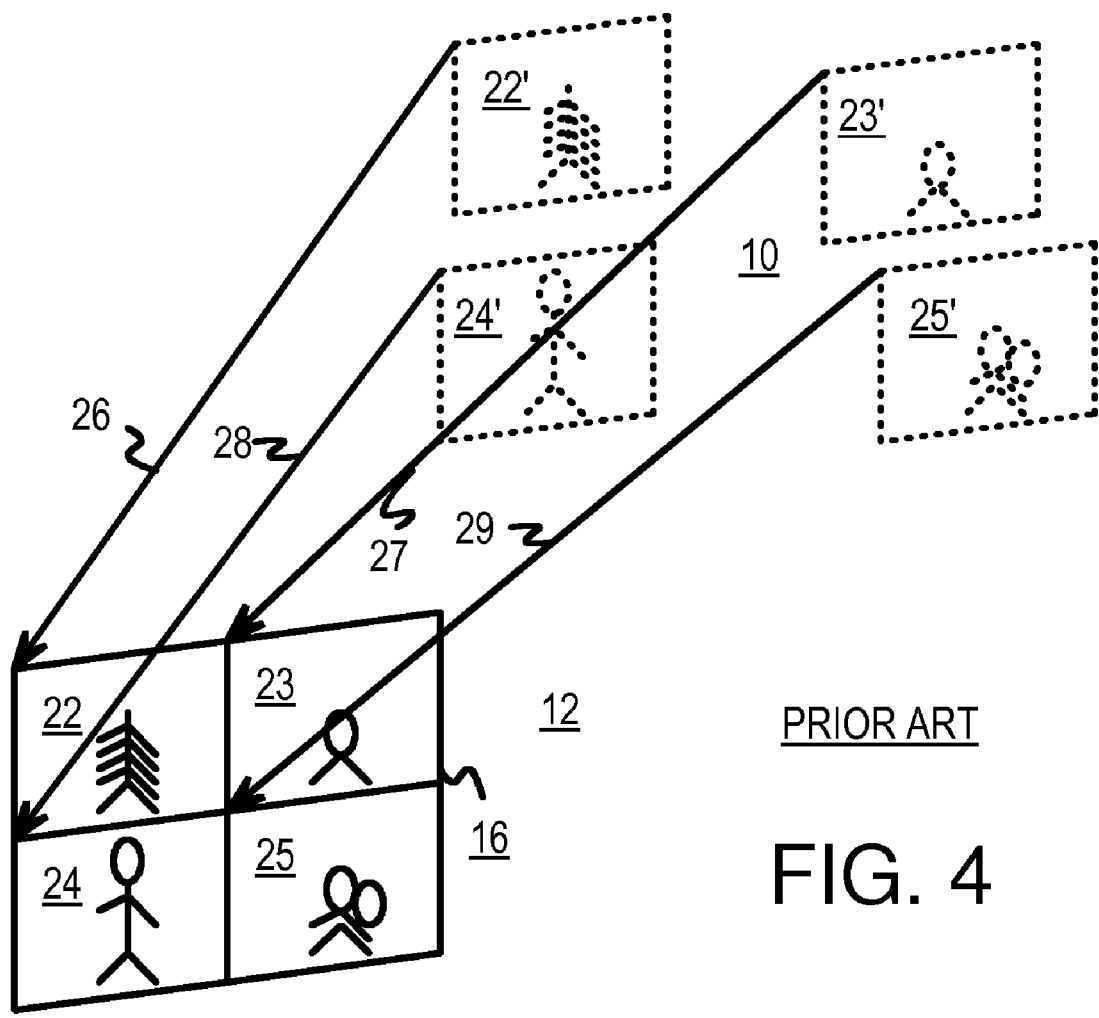
FIG. 4 shows that separate motion vectors can be encoded for each of the 4 blocks in a macroblock.
Figure 5:
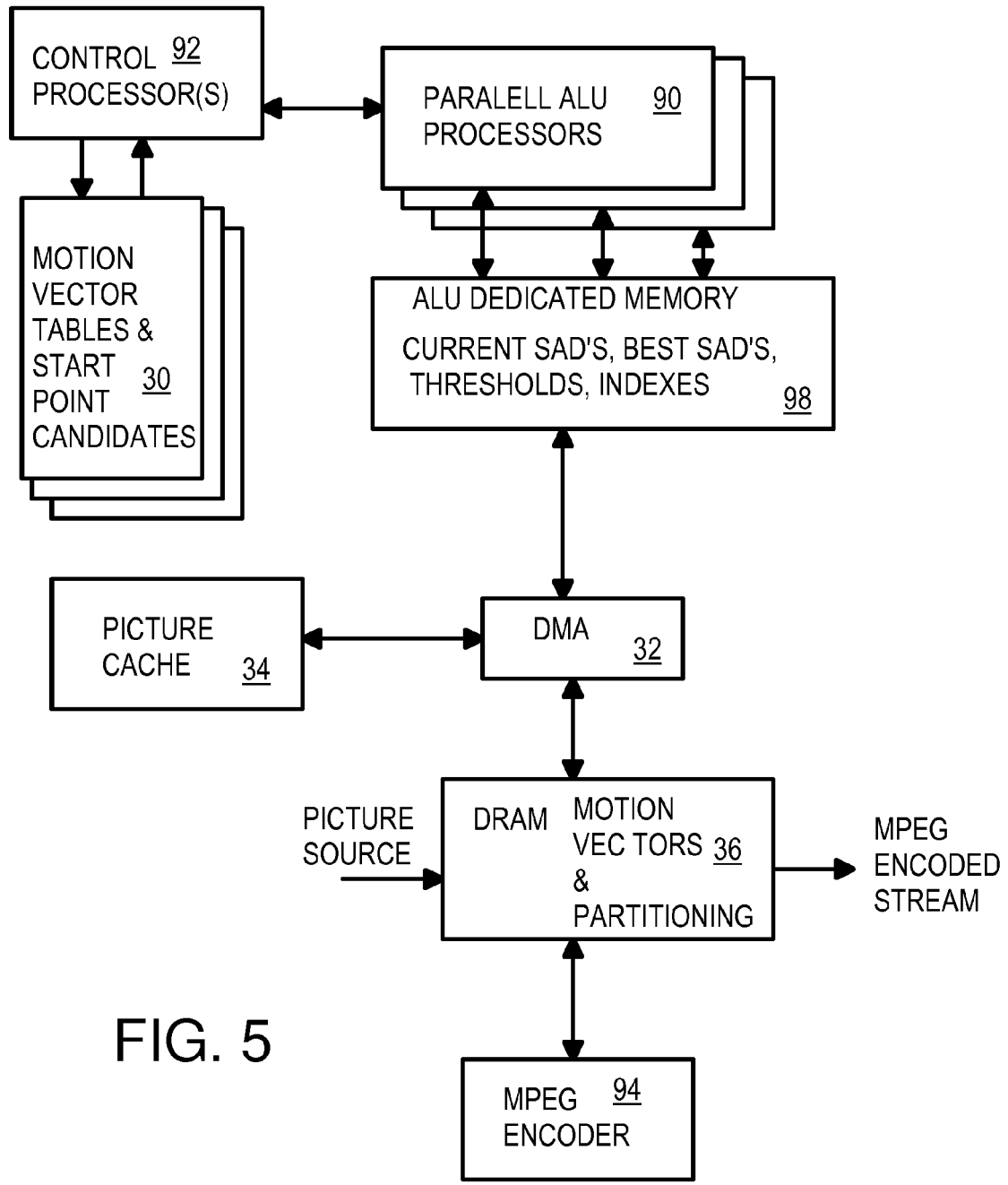
FIG. 5 is a block diagram of a parallel processing system for encoding video streams.

FIG. 5 is a block diagram of a parallel processing system for encoding video streams. Control processor 92 performs initial processing to set up motion vector tables 30 with coordinates that represent a search strategy. Control processor 92 may contain one or more processors and may perform a variety of tasks.

Parallel processors 90 contain K processors, where K may be tens, hundreds or thousands of processors or Arithmetic Logic Units (ALU's). For example, an Array Processor Architecture (APA) such as described in U.S. Pat. Nos. 6,460,127, 6,711,665, and 6,757,703 may be used as parallel processors 90. Since there are K processors that can independently execute routines of instructions and operate on their own data, parallel processors 90 are ideally suited for performing K sets of calculations. As FIG. 6 shows, the motion-vector searches are divided into K sectors or directions, with each of the K processors of parallel processors 90 performing calculations for a different one of the K directions of the search.

Parallel processors 90 initially generate starting point candidates, which are stored back into motion vector tables 30 under the direction of control processor 92. One of the starting point candidates is chosen as the starting point for the searches in K directions. The search can be performed around the initial starting point, and then the results from the initial search are used to narrow down the search area, and then the search switches to a new starting point and continues over a smaller search area, perhaps with a different search strategy. Thus both sparse and dense searches may be performed using various starting points.

ALU dedicated memory 98 is a working memory for use by parallel processors 90. ALU dedicated memory 98 stores intermediate values calculated by parallel processors 90 when performing a search. In particular, the best and current sum-of absolute difference (SAD) values may be stored, along with threshold values and indexes that refer to corresponding locations in motion vector tables 30. Additional local memories such as caches may be used by and located with each of the K processors in parallel processors 90.

DRAM 36 is a larger main memory that stores final results such as the final motion vectors and any partitioning information. Partitioning information describes how each macroblock is partitioned. For example, if 7 motion vectors are output (for three blocks of 8×8 and four blocks of 4×4), partitioning information can indicate which one of four 8×8 blocks is further divided into 4×4 blocks. The final motion vector for each macroblock is used by MPEG encoder 94 to encode the video stream from the picture source to generate an output MPEG encoded bitstream. Various buffers may be located in DRAM 36, such as input and output picture buffers.

Picture cache 34 may contain pixels for a current picture frame being processed, or for two or more frames that are being searched for best-match SAD's. Direct-Memory-Access (DMA) controller 32 is an intelligent DMA controller that moves blocks of data among DRAM 36, picture cache 34, and ALU dedicated memory 98.

FIG. 6A-D highlight a two-level motion-estimation search using motion vector tables for arbitrary search patterns. A sparse-level search is first performed from an initial starting point, then the results from the sparse-level search are used to generate a second starting point for a dense-level search. The dense-level search searches over a smaller area than does the sparse-level search.

Figure 6A:
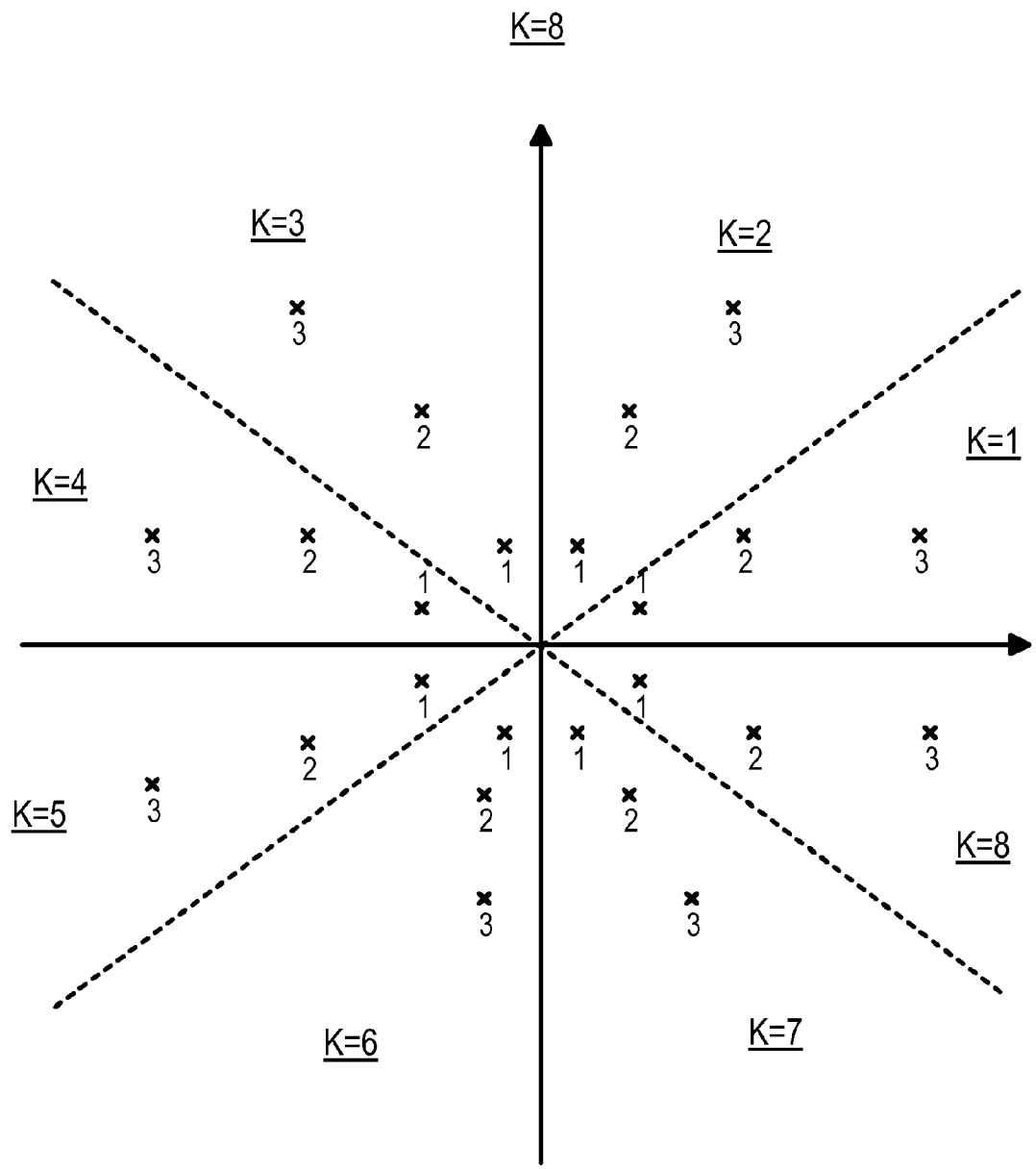
FIG. 6A-D highlight a two-level motion-estimation search using motion vector tables for arbitrary search patterns.

In FIG. 6A, the sparse-level search is shown in a X-Y graph representing the current frame being searched over for the best match of a macroblock. The best match is generally the X,Y location in the current frame that has the smallest difference in pixel values from the macroblock in the old frame being search for. Motion vector cost may also be considered. The specifics of bitstream encoding may cause some motion vectors to take fewer bits to encode than others, so they may be chosen even if their SAD is not the lowest, due to their lower motion vector cost.

It is generally not possible to calculate the pixel value difference for all possible X,Y locations in the current frame, since there are too many X,Y locations in a frame. Instead, a sparse search is performed over a small sample of possible X,Y locations. FIG. 6A graphically shows those X,Y locations.

The current frame is divided into K sectors or directions. Each of the K processors in parallel processors 90 (FIG. 5) performs a search in one of the K directions. For example, processor #3 in parallel processors 90 could perform the search for sector K=3, first calculating the block pixel difference for point 1 in sector K=3, then calculating the pixel difference for point 2 in sector K=3, and finally calculating the pixel difference for point 3 in sector K=3, assuming the search does not terminate early.

Another processor (#5) in parallel processors 90 simultaneously calculates the pixel differences for points 1, 2, 3 in sector K=5. When parallel processors 90 contains 8 processors, 8 sectors can be processed simultaneously. When parallel processors 90 contains 128 processors, 128 sectors can be processed simultaneously. Thus additional processors in parallel processors 90 allows for many different directions to be checked at the same time, yielding more opportunities to find the best X,Y location in the current frame.

The initial starting point is the best point out of the starting-point candidates, such as the origin, point (0,0). The first search steps are points 1 in FIG. 6A. There are K of these initial search points, one for each sector; one for each processor in parallel processors 90. There may be many subsequent search points 2, 3, . . . , although only a total of 3 points per sector are shown in this simplified embodiment.

The X,Y points that are searched and have their pixel differences calculated do not have to fit any mathematical formula. Instead, the points can be chosen manually, or can be altered in various ways to improve motion estimation efficiency. For example, a close look at FIG. 6A reveals that the X coordinates are stretched relative to the Y coordinates. When motion is more likely to occur along the X axis than the Y axis, this kind of a skewed search is preferred, since larger displacements in the X direction are checked for than in the Y direction. Many real-life videos, such as of cars driving or people walking, are more likely to have larger X displacements than Y displacements.

Storing the X,Y search points shown in FIG. 6A in motion vector tables 30 allows any arbitrary search pattern to be used, even search patterns that cannot be described by a mathematical formula. Thus great flexibility is provided by storing the X,Y points of a search strategy in motion vector tables 30.

The pixel differences for each of the 24 search points shown FIG. 6A is performed by the K processors in parallel processors 90. The pixel differences can each be a sum-of-absolute difference (SAD) for a 16×16 macroblock, or can be the sum of four SAD's for four 8×8 blocks, or the sum of 16 SAD's for 16 4×4 blocks. Various preference factors can be combined with the SAD's to determine the current SAD for an X,Y point, and to compare to other current SAD's to find the best SAD over all search points. One the 24 search points is thus chosen as the best match. In this example, point 3 in sector K=1 is chosen as the best match for the sparse-level search.

Figure 6B:
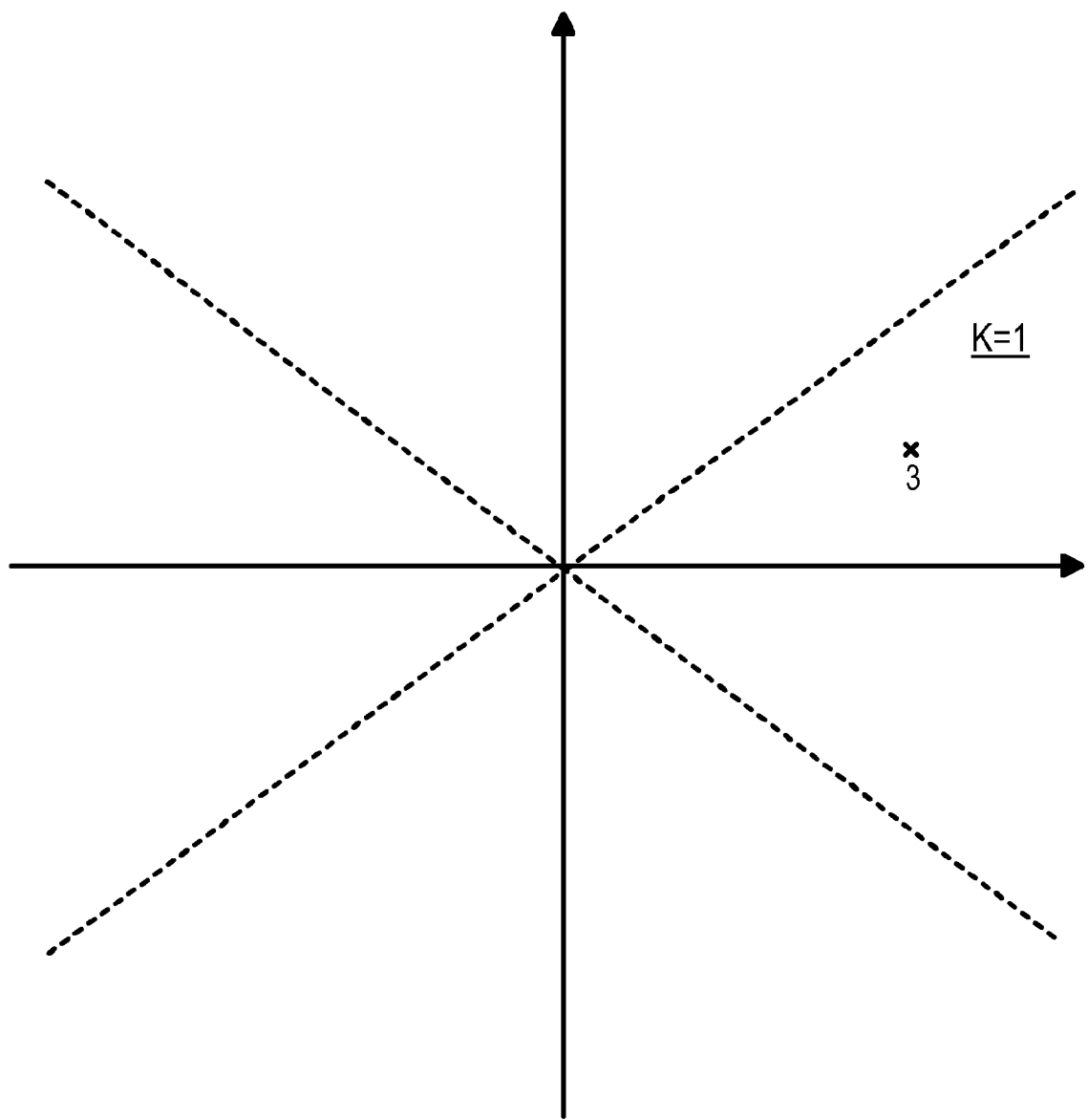
Figure 6C:
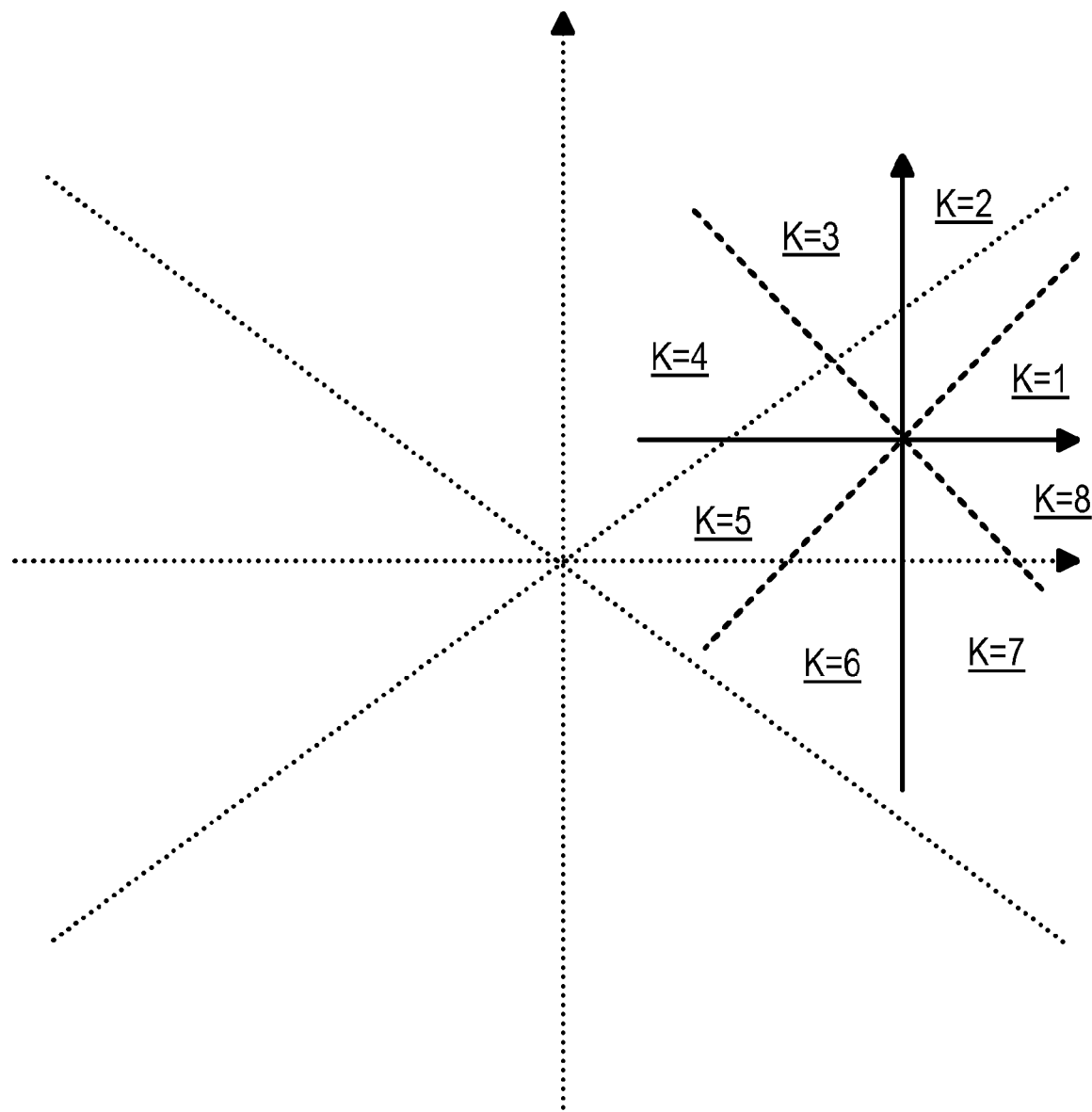

FIG. 6B shows that point 3 in sector K=1 is chosen as the best match for the sparse-level search. This point becomes the new center of the next-level search, as shown in FIG. 6C. The next-level search is also divided into K sectors that are centered on this new center.

Figure 6D:
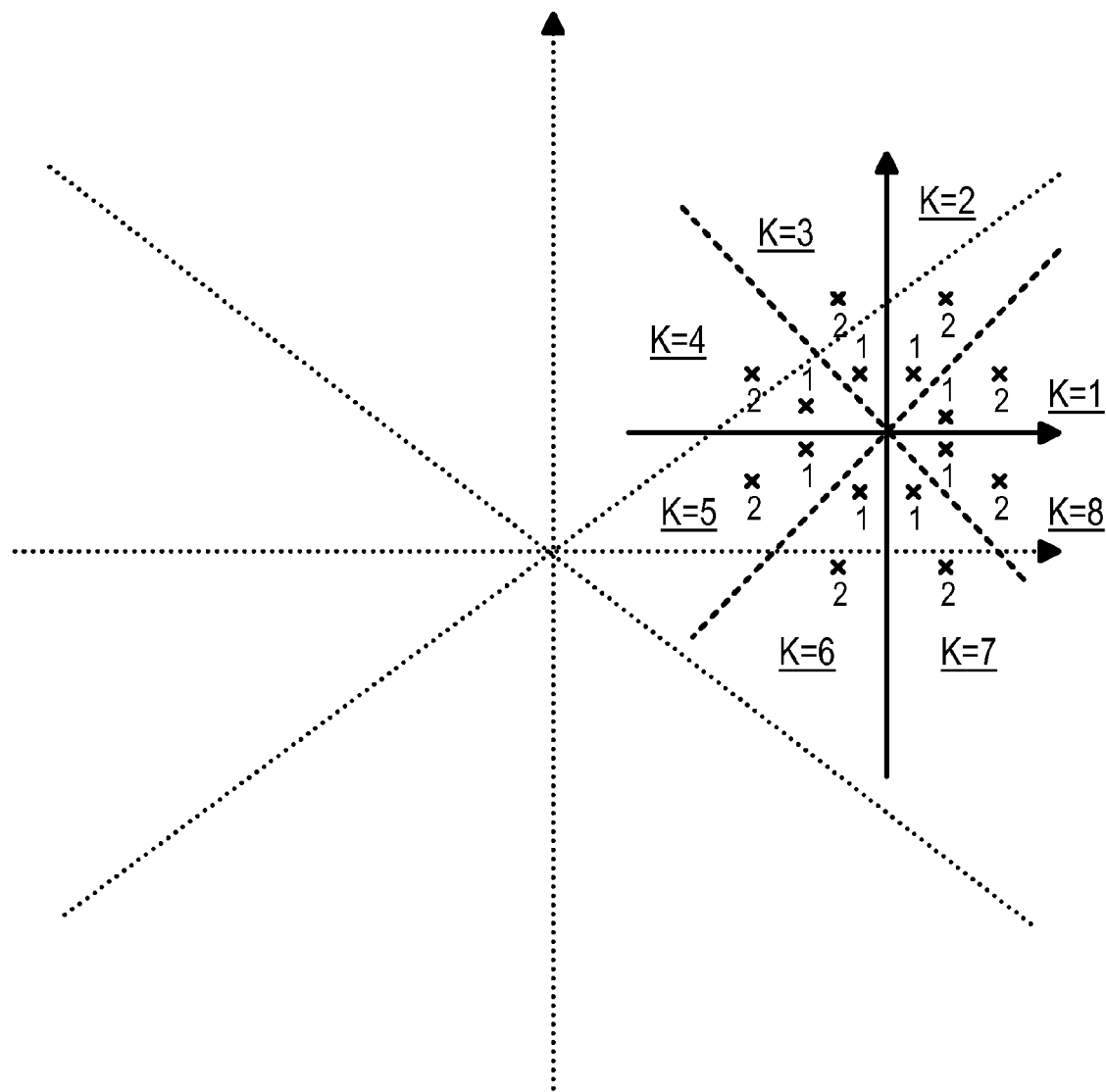

In FIG. 6D, the dense-level search is performed. The K sectors are centered on the center point, which was the best-matching point from the sparse-level search of FIGS. 6A-B. New search points "1" are generated by adding values from the motion vector tables to the new/current start point, and each of the K processors in parallel processors 90 calculates SAD values for points 1, 2 in the processor's sector. One of these 16 points is chosen as the best match for the dense-level search.

The final motion vector for the macroblock is obtained by combining the results of the sparse-level and dense-level searches. For example, the X,Y point from the best-matching sparse-level search can be added to the relative displacement of the best-matching X,Y point (relative to the new search center) of the dense-level search to obtain the final X,Y point of the motion vector.

Many more search points per sector and more levels than just the two sparse and dense levels may be added in a typical system. Any level of search may terminate early, before all search points have been calculated, when various conditions are met, such as when SAD's are less than a threshold value, or SAD's are increasing rather than decreasing over a certain number of search points. More processors allow for more search directions to be processed simultaneously, improving search coverage and results.

Figure 7:
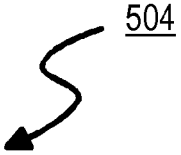
FIG. 7 shows sparse and dense motion vector tables.

FIG. 7 shows sparse and dense motion vector tables. Sparse motion vector tables 502 contain K partitions, one for each of the K processors in parallel processors 90. Each partition contains a series of X,Y points that a processor checks by calculating SAD values and comparing to earlier SAD values and thresholds. Thus the X,Y points in motion vector tables 502 contain the search strategy for the sparse-level search. These X,Y points are relative to the macroblock's location in the old frame, or more precisely are relative to the current start point, which is relative to the original macroblock location in the frame.

Dense motion vector tables 504 also contain K partitions, one for each of the K processors in parallel processors 90. Each partition contains another series of X,Y points that a processor checks by calculating SAD values and comparing to earlier SAD values and thresholds. Thus the X,Y points in motion vector tables 504 contain the search strategy for the dense-level search. These X,Y points are displacements relative to the current center of the search, rather than absolute X,Y coordinates of the frame.

Motion vector tables 30 of FIG. 5 may contain both tables 502, 504, and additional tables for additional levels of search. The size of the steps between successive points in a search sector is typically smaller for the dense search of table 504 than for the sparse search of table 502.

FIG. 8 shows a table of current and best SAD's stored in the ALU dedicated memory. ALU dedicated memory 98 of FIG. 5 stores intermediate results as a search-level is being processed by the K processors in parallel processors 90. ALU dedicated memory 98 is flushed after each search-level, such as at the end of the sparse-level search, and again after the dense-level search, and after each intermediate-density-level search between the sparse-level search and the dense-level search.

Each macroblock in the old frame can be sub-divided into four 8×8 blocks in the new frame, or into sixteen 4×4 blocks in the current frame. The 8×8 or 4×4 blocks may move independently of each other in the current frame, allowing for better matching. Each processor, for each X,Y search point, calculates SAD's for all possible block combinations: one 16×16 macroblock, four 8×8 blocks, and 16 4×4 blocks. The best matching location is found for each of these blocks, for a total of 1+4+16=21 blocks. Each of these 21 blocks is given a unique block ID, as shown in the second column of FIG. 8.

A current SAD is calculated for each of the 21 blocks for the current search point or X,Y coordinate read from motion vector tables 30. These current SAD's are stored in the table as A1, A2, A3, . . . A21 for the first sector and the first search point. The index into motion vector tables 30 for this search point, I1, is also stored for all 21 current SAD's.

A running best SAD is also kept by this processor, and for each of the 21 block-dividing possibilities. The best SAD may be the lowest SAD value encountered so far for this block, although the current SAD's may be altered for expense or other factors before comparison to the old best SAD. When the current SAD is lower than the best SAD, than the current SAD is copied to the best SAD, and the current index into motion vector tables 30 is also copied to the best SAD index. For example, current SAD A7 overwrites best SAD B7, and its index I1 overwrites best-SAD index J7 when current SAD A7 is lower than best SAD B7.

Thresholds are also stored for each of the 21 blocks. The threshold values C1, C2, 3, . . . C21 are the same for all sectors and for all steps. Threshold values may be changed when choosing a new start point and switching from one search-level to another. Having multiple copies of the threshold values is useful since each processor can be allowed to access only its local portion of ALU dedicated memory 98, rather than having to access a shared portion of ALU dedicated memory 98 that contains the only copy of the thresholds.

Each of the K processors has a local area of ALU dedicated memory 98 with 21 rows of data. Each row stores the current and best SAD's and the threshold for a block, and the indexes for the current and best SAD's, which allows the processor to find the corresponding X,Y point for the step that produced the best or current SAD.

As a processor completes processing of one X,Y search point, it over-writes the current SAD values and indexes.

When there are S search points, or S steps, for each sector, and there are K sectors, then ALU dedicated memory 98. There are K*S search points, and thus K*S indexes into motion vector tables 30. K*S*21 is the total number of all possible values during processing of one macroblock, of which only K*21 values need to be stored at any time inside ALU dedicated memory 98.

Figure 9:
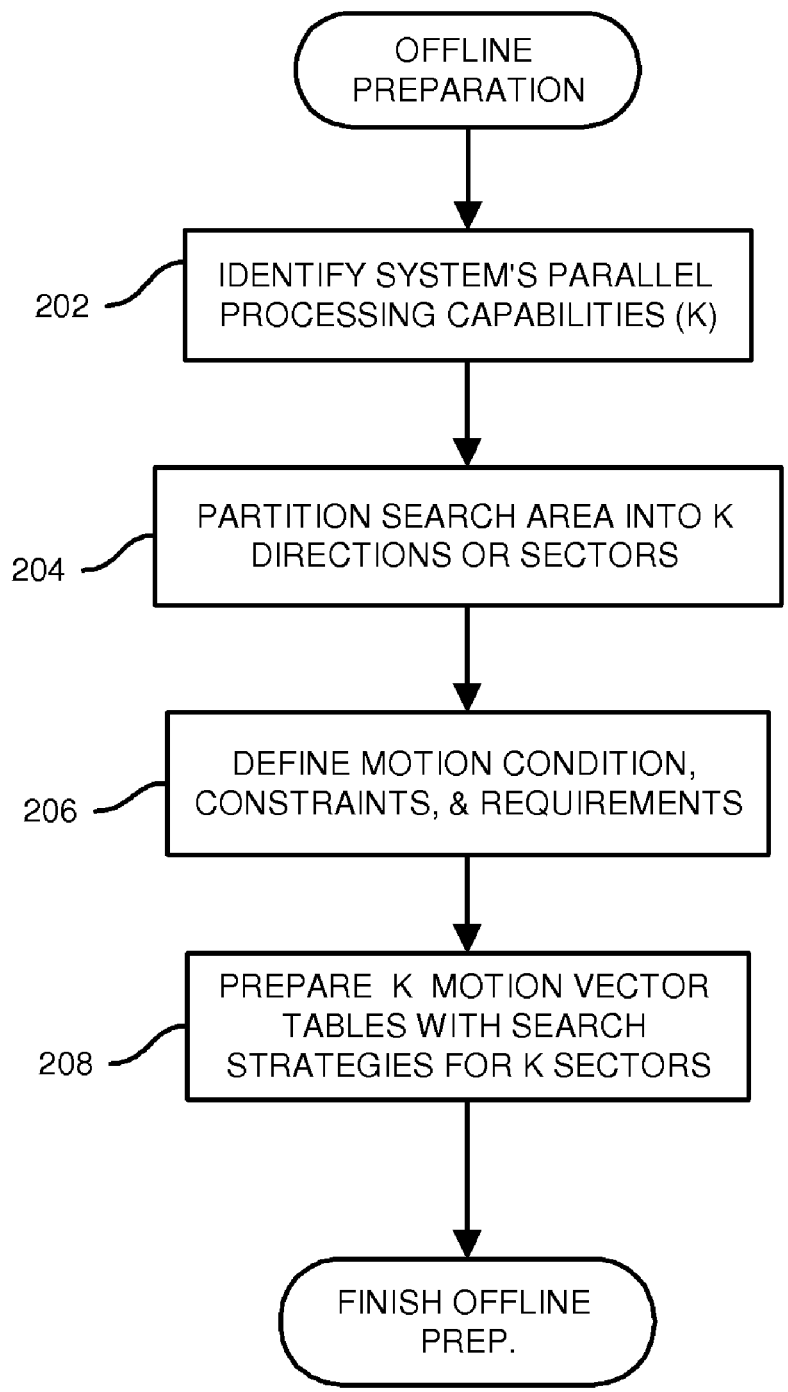
FIG. 9 is a flowchart of offline preparation for parallel motion estimation.

FIG. 9 is a flowchart of offline preparation for parallel motion estimation. Control processor 92 (FIG. 5) can perform these steps before parallel processors 90 perform the motion estimation search, or control processor 92 can assign another processor to perform these pre-processing steps.

The parallel processing capabilities of the system are discovered, step 202. The number of parallel processors available, K, is identified. The search is partitioned into K sectors or directions, step 204. Each sector can be assigned an arc of 360/K degrees.

Motion conditions, constraints, and requirements are defined, step 206. This can include skewing stretching the search in the X-direction for videos that are more likely to have motion in the X direction than in the Y direction, setting thresholds and targets, etc. Constraints may be based on the required output quality and the bitrate and expected/required search speed. Various static parameters may be defined or selected, such as the size of the search range, the number of tables and number of steps in each table, the density of candidates in each table (prior knowledge of the nature of the input video can help to define better-suited strategies). The static threshold components may include: intra-coding thresholds, SAD thresholds, skipping the search table, threshold factors, various modes and features selection, etc.

The X,Y points that define the search strategy are written into motion vector tables 30, step 208. These points could be read from a template table and scaled, stretched, or altered. These points are relative to the search center point, which is the current start point, and follow K paths outward from the search center.

Figure 10:
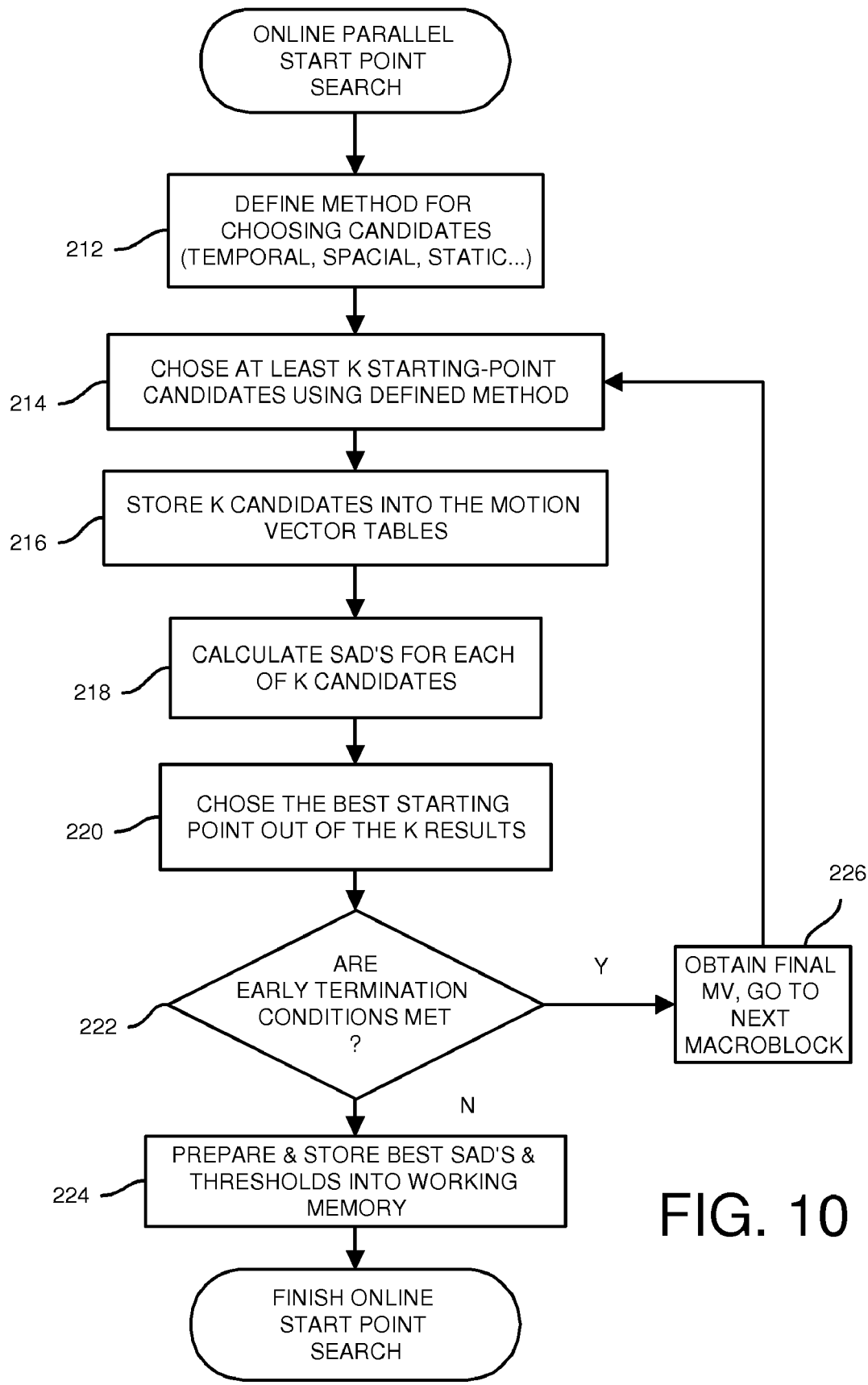
FIG. 10 is a flowchart of a parallel search for an initial starting point.

FIG. 10 is a flowchart of a parallel search for an initial starting point. The starting point is later used as the search center point of the parallel search for the sparse-level search.

The method for choosing candidates is defined, step 212. Methods such as spacial, temporal, static, etc. may be used to select candidates. A combination of spatial predictors (the already calculated nearest neighbors' motion vectors from the currently processed frame), temporal predictors (motion vectors of neighbors and the block itself, from the previous frame(s)), and static predictors (some statically-defined points relative to the 0:0 position, which can already be present in the motion vector tables) may be used. The chosen method(s) is used to select at least K candidates for the starting point, step 214. The K candidates are stored into motion vector tables 30, step 216.

The SAD's for each of the K candidates are calculated in parallel by the K processors, step 218. The K SAD's are examined to find the best result, such as the one with the lowest SAD, or lowest SAD after various adjustment factors are included. Adjustment factor may include the Motion Vector cost, which may indicate a number of bits that are required to store the motion vector into the bitstream. The best SAD is selected, step 220, and its location is selected as the starting point.

Early termination conditions are checked, step 222. Early termination conditions can occur when the best SAD is very low (such as lower than one of the SAD thresholds). Early termination conditions may occur for an upper limit when the best SAD is too high. Then the macroblock may be marked as Intra, and no further motion estimation is performed. Early termination conditions indicate that no more processing is required, and the best SAD can be used to obtain the final motion vector for this macroblock. For example, the best SAD may be zero, indicating that no motion occurred, so no further motion search is required. The final motion vector for this macroblock is obtained from the tables, and the process moves on to the next macroblock in the current frame, step 226, and processing continues with candidates chosen for the next macroblock, step 214.

When the early termination conditions are not met, the best SAD is stored into ALU dedicated memory 98. Thresholds are generated based on the current block's quantization parameter, threshold factors, and motion vector cost and also stored in ALU dedicated memory 98.

Figure 11A:
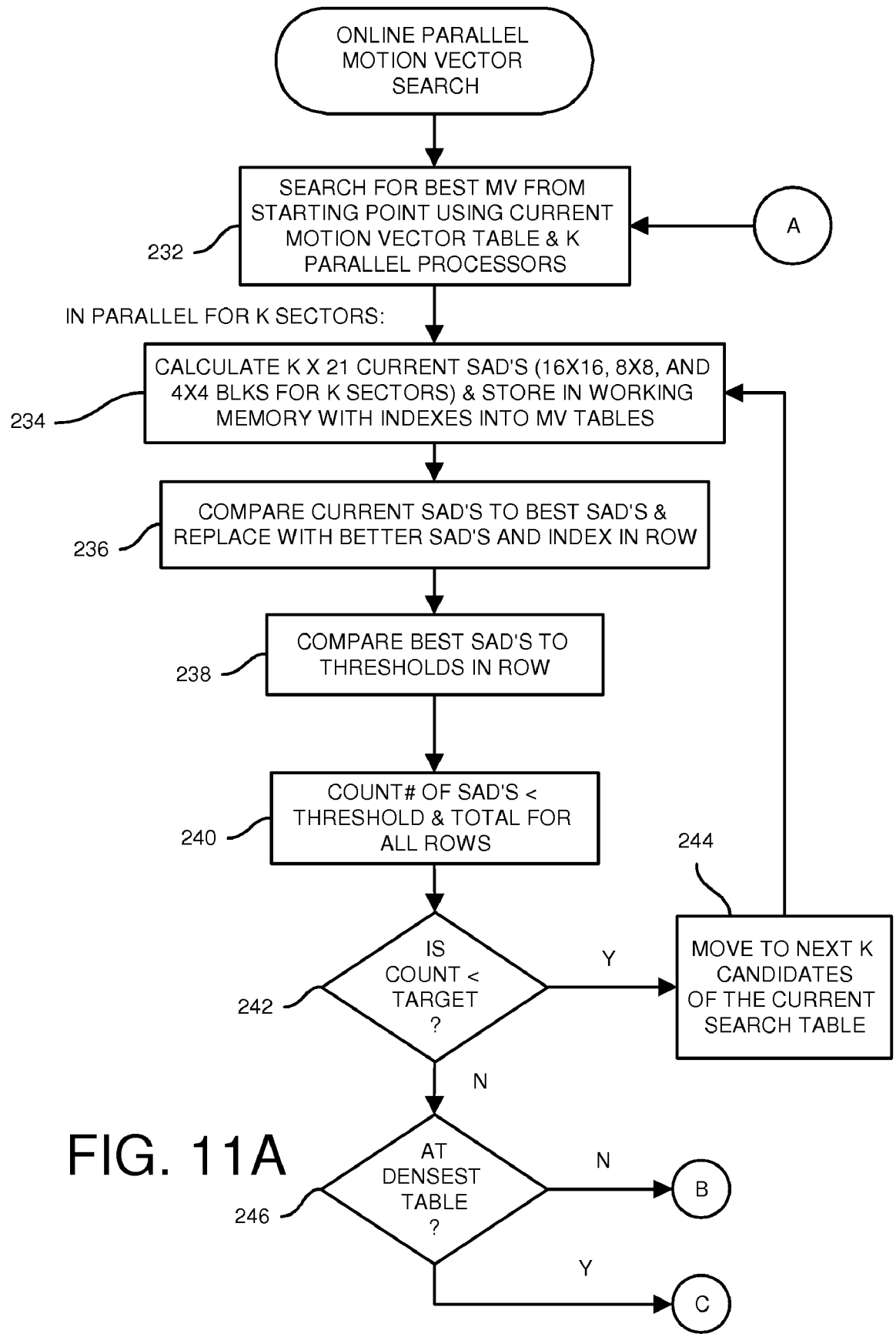
FIGS. 11A-C show a flowchart of parallel motion estimation using parallel processors.
Figure 11B:
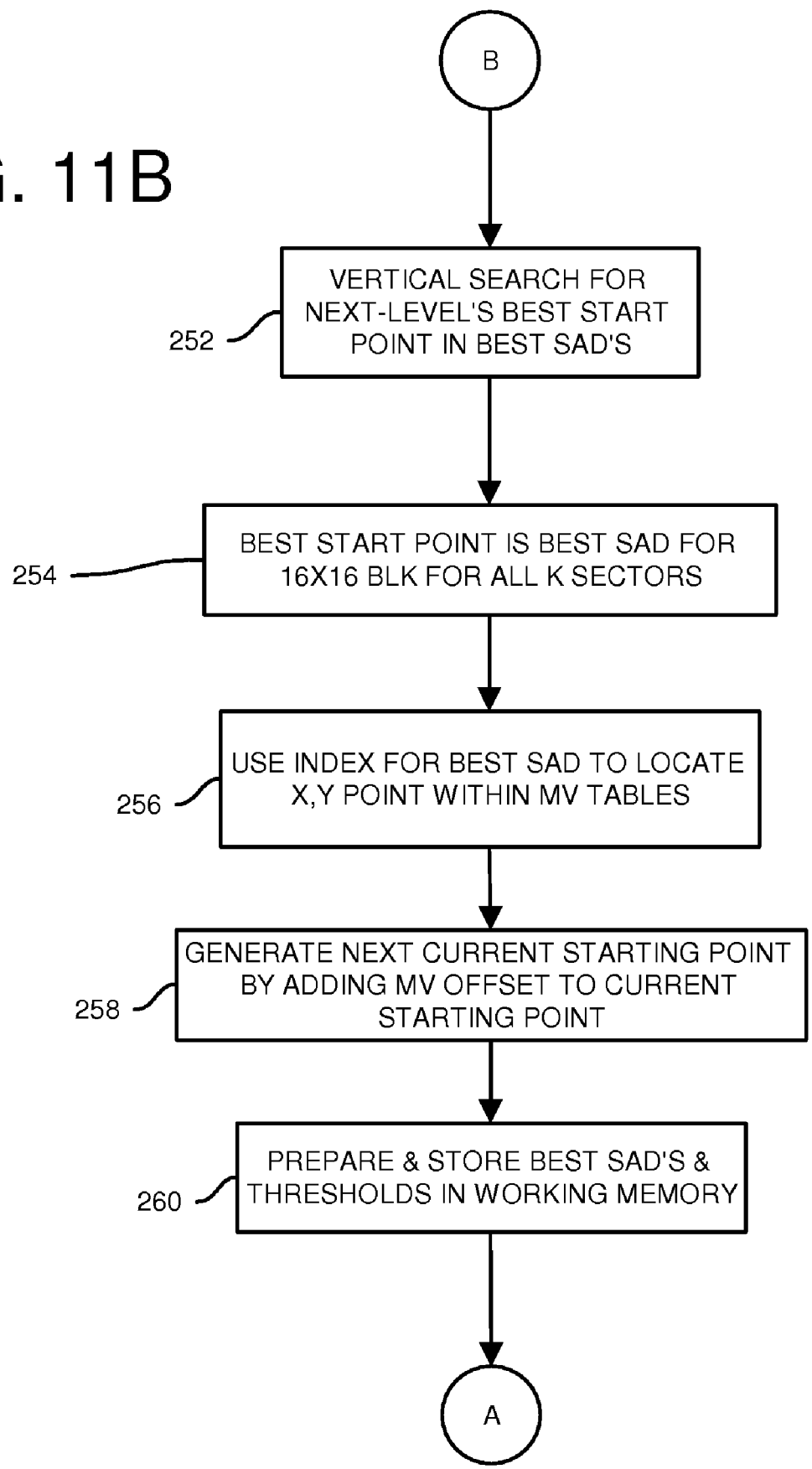
Figure 11C:
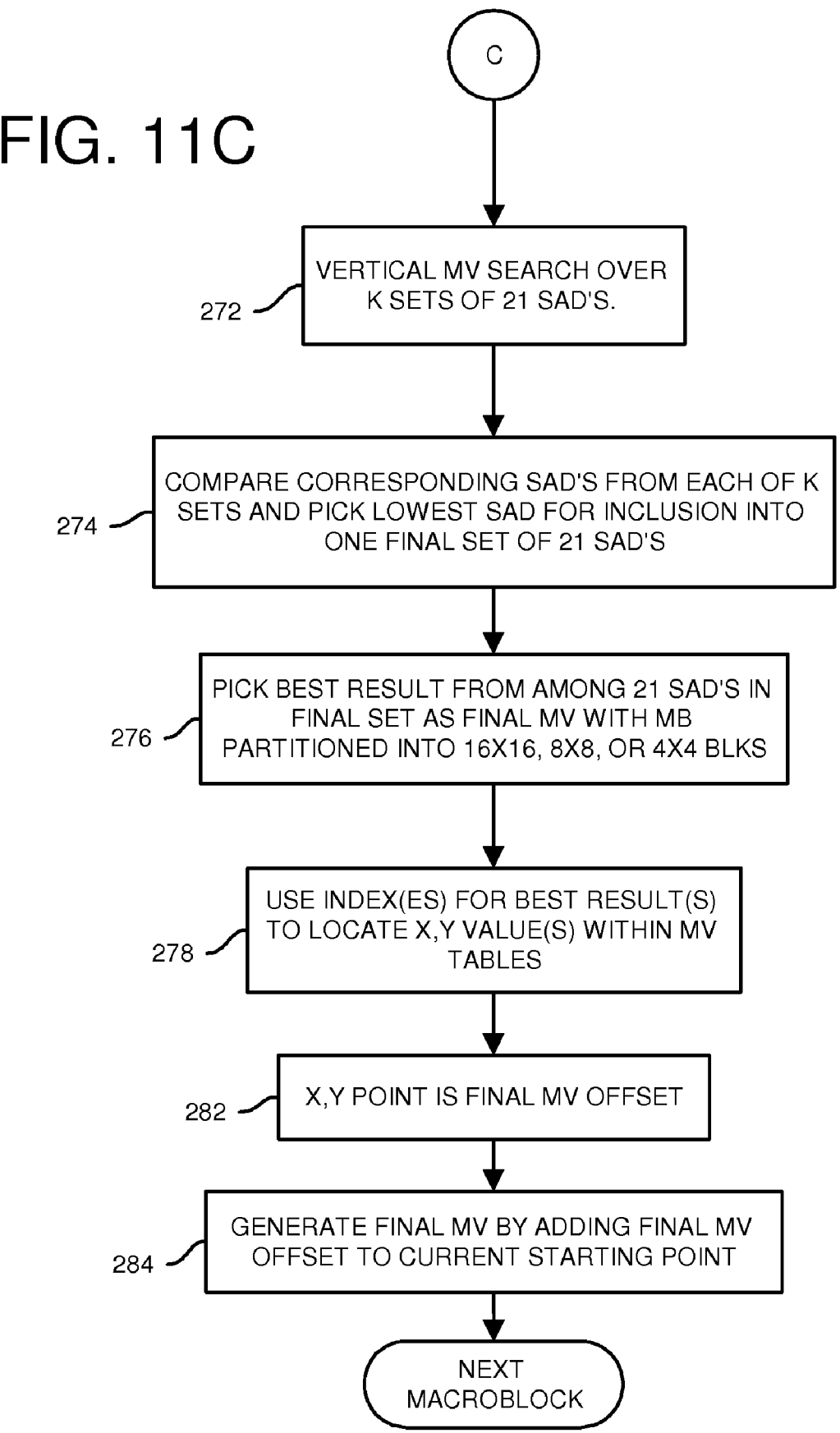

FIGS. 11A-C show a flowchart of parallel motion estimation using parallel processors. The starting point has been pre-loaded into ALU dedicated memory 98 using the process of FIG. 10. The search strategy is described by the X,Y points in motion vector tables 30, for this search-level. Each search-level can have a different search strategy, allowing denser search patterns of the dense-level search to be optimized for smaller areas than at the sparse-level search.

Using the initial starting point chosen by the process of FIG. 10, the search for the best motion vector uses motion vector tables 30 and the K processors of parallel processors 90, step 232. Each of the K parallel processors performs steps 234-238 in parallel with other processors, allowing for faster searches.

Each processor calculates 21 current SAD's for the 21 possible blocks derived from one macroblock, step 234. These K*21 current SAD's from the K processors are stored as the current SAD's in ALU dedicated memory 98, along with the indexes for the first step or X,Y point in motion vector tables 30.

For each logical row of ALU dedicated memory 98, as shown by the rows in the table shown in FIG. 8, the current SAD that was just calculated in step 234 is compared to the best SAD stored in that row, step 236. When the current SAD is worse than the best SAD, no further action is taken. However, when the current SAD is better than the best SAD, such as by having an lower value after any adjustment factors, then the best SAD is replaced by the current SAD, and the current SAD's index is copied to the best SAD's index.

The best SAD's are compared to the thresholds for each row of this step, step 238. A flag in a row can be set for that row when the best SAD is better than the threshold. These row flags can then be counted as the threshold count for all rows for the current step, step 240. When the threshold count of row flags is less than the target, the search can continue with the next X,Y points on each of the K paths as the next step, step 244. Steps 234-242 are repeated for this next step. These steps continue, with the K processors calculating SAD's for each successive outward X,Y point on paths spiraling outward from the center point, until the threshold count is reached, step 242, or until no more points are left.

When the current search-level is not the densest level, step 246, then the next denser search-level is processed, FIG. 11B. When the current search-level is the densest level, such as the dense-level search, step 246, then final processing occurs, FIG. 11C.

In FIG. 11B, a vertical search across all rows for all K processors is made, step 252. This vertical search compares the best SAD's of each row, to find the overall best SAD. However, only the rows for 16×16 macroblocks are searched, although all rows could be searched in other embodiments, with corrections made for the smaller 8×8 and 4×4 blocks. The best starting point is selected by finding the best SAD of all the 16×16 macroblocks, step 254.

The best starting point is the X,Y point in motion vector tables 30 that is located by the index for the best SAD of all the 16×16 macroblocks, step 256. The best index is read from the row with the lowest best SAD in ALU dedicated memory 98. The next current starting point is generated from this X,Y point read from motion vector tables 30 by adding the current level's starting point to the X,Y point for the best SAD, step 258. This translation accounts for the current-level search center being offset from the macroblock's true origin, and for any other levels of searches already performed.

The best SAD's and thresholds are replaced in ALU dedicated memory 98 with new thresholds, while other data is cleared for use by the next search-level, step 260. Different thresholds may be loaded for each search-level. The best SAD's can be set to a preset value for all rows. Then the next search-level is processed from step 232 of FIG. 11A. After the best result of the current search level is found, its location is used as a new starting point for the next search-level. The best SAD's motion vector is then created new (in ALU dedicated memory 98) out of 21 SAD values stored K times.

In FIG. 11C, all search-levels have been processed, including the densest search-level. A vertical search across all rows for all K processors in the last search-level is made, step 272. This vertical search compares the best SAD's of each row, to find the overall best SAD. All rows are searched, including rows for 16×16, 8×8, and 4×4 blocks. Rows for corresponding blocks are compared to one another: rows for the 16×16 blocks are compared and the best SAD for the 16×16 blocks is obtained, rows for the upper-left 8×8 block are compared and one best SAD for the upper-left 8×8 block is obtained, rows for the lower-left 8×8 block are compared and one best SAD for the lower-left 8×8 block is obtained, etc. A total of 21 best SAD's are thus obtained, for the 21 blocks, step 274.

The result is determined by finding the best SAD of all the possible block divisions, step 274. For example, the best SAD's of the four 8×8 blocks are summed, averaged, or otherwise combined to get a net best SAD for 8×8, while the best SAD's of the sixteen 4×4 blocks are summed, averaged, or otherwise combined to get a net best SAD for 4×4 partitioning. The best result is obtained from among the three possible partitioning: the net best SAD for 8×8, the net best SAD for 4×4, and the best SAD for 16×16. The lowest of these 3 SAD's may be selected, or correction factors can be included for the smaller 8×8 and 4×4 blocks. The best combination of the results determines the partitioning of the macroblock, step 276.

The best index or indexes are read from the row(s) with the lowest best net SAD in ALU dedicated memory 98, step 278. When 8×8 blocks are the best partitioning, four indexes are read; when 4×4 blocks are the best partitioning, sixteen indexes are read. It is also possible to read one 8×8 index and 12 4×4 indexes. Any partitions allowed by the standard are possible, or a subset of the allowed partitions. Multiple levels of partitions may also be allowed.

The X,Y point read from motion vector tables 30 by the index is the final motion-vector offset for that block, step 282. When the 16×16 block has the best net SAD, only one final motion vector is needed. When the 8×8 block has the best net SAD, four final motion vectors are needed, one for each of the 8×8 blocks. When the 4×4 block has the best net SAD, sixteen final motion vectors are needed, one for each of the 4×4 blocks.

The final motion-vector is generated for each partitioned block from the X,Y points read from motion vector tables 30 by adding the final search-level's starting point to the X,Y point for the best SAD, step 284. This translation accounts for the each level's search center being offset from the macroblock's true origin.

The final motion vectors can be written to the DRAM and used by the motion estimator to encode the macroblock. Pixels in the macroblock are replaced by the motion vector, vastly reducing the amount of data required to represent the macroblock.

Each of the four 8×8 blocks may have a different relative displacement from the original macroblock. One search point may produce a best SAD for one of the 8×8 blocks, while another search point may produce a best SAD for another one of the 8×8 blocks from a single macroblock in the old frame. When determining the net best SAD, the best SAD's for each of the 4 8×8 blocks is selected, and then these best SAD's are summed or otherwise combined to get a net best SAD than can be compared with the 16×16 block SAD.

Likewise, the 16 4×4 blocks each have separate best SAD's, which may correspond to different X,Y locations, and these 16 best SAD's are summed and compared to the net best SAD's for the 16×16 and 8×8 blocks. The best of the 3 net best SAD's is chosen as the final best SAD, and the macroblock is divided or partitioned according to the selected final best SAD, either into four 8×8 blocks when the 8×8 net best SAD is the lowest, or into 16 4×4 blocks when the 4×4 net best SAD is the lowest, or undivided as a 16×16 macroblock when it has the lowest net best SAD.

The net best SAD's can be adjusted by an expense factor that compensates for the increased complexity of the smaller blocks, so that a macroblock is only divided into smaller blocks when the net best SAD's for the smaller blocks are significantly better than the macroblock's net best SAD. For example, 8×8 blocks could need a 30% better net best SAD than a 16×16 macroblock, while 4×4 blocks could need a 60% better SAD, using expense factors of 1.3 and 1.6 that are multiplied with the net best SAD's of the 8×8 and 4×4 blocks.

Figure 12:
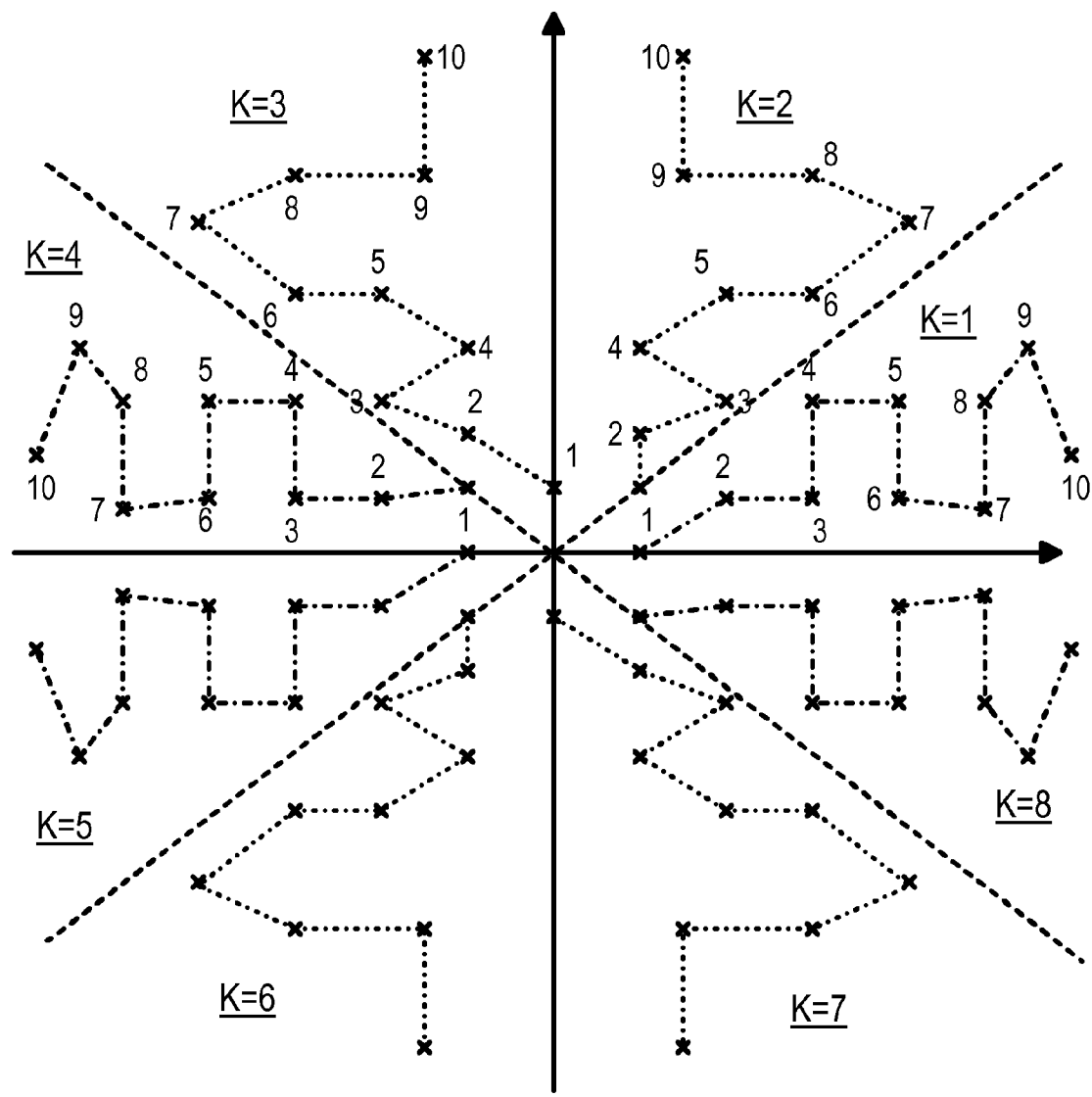
FIG. 12 shows an example of a search strategy.

FIG. 12 shows an example of a search strategy. In each of the eight sectors or directions, the search points expand outward from the search center in a complex zigzagging pattern. In FIG. 6A, the search points moved outward in a simpler curved pattern. In FIG. 12, the multiple inflexion points on each sector's search pattern allows for better coverage of search points.

The complex pattern of each sector's search points cannot be described easily by a mathematical formula. However, the X,Y points may be stored in tabular form in motion vector tables 30. Thus motion vector tables 30 allows for arbitrarily complex search patterns to be processed. A number of search points per sector may be stored, limited only by the motion-vector table size. For example, 10 points per sector or some other number of points per sector may be stored such as shown in FIG. 12.

Alternate Embodiments

Several other embodiments are contemplated by the inventors. For example the calculation steps such as the SAD calculation and comparisons can be performed by dedicated hardware in the ALU or by a programmable engine such as a digital-signal processor (DSP) or microprocessor. Separate hardware registers or a portion of a larger memory can be set aside for ALU dedicated memory 98. Other registers can be added as pipeline latches of FIFO buffers. The described method may use only tens of processors. However, the number of sectors can be significantly increased, and hundreds or thousands of processors could be used. Several processors could be used to calculate SADs for one 16×16 block; several search steps could be performed for each clock; or several candidates in each sector could be processed at each step, etc.

Various SAD formulas can be substituted for the pixel differences or Euclid distance, even though these formulas may not exactly calculate the true distance between motion vectors. For example, the squares of the distances can be calculated and compared. The absolute values of the differences in X and Y coordinates could be used instead of the squares of the distances, or the ratio of the maximum distance to the minimum distance could be compared to some threshold value.

Different sizes of macroblocks and blocks could be substituted. The number of blocks per macroblock could be varied, such as having 16 blocks for each macroblock, which might be a larger macroblock. The size of the macroblock could vary and be determined by headers for the video object planes or by a bitstream configuration.

Numbers such as SAD's, parameters, and factors could be shifted, inverted, etc. Routines could be altered and steps re-ordered. The number of processors or ALU's in parallel processors 90 can be a large number, such as 128, 256, 1024, or more processors. Tables can be organized in a variety of logical and physical ways. For example, the rows shown in FIG. 8 could occupy several physical rows of memory, or one physical row of memory could have many rows of current and best SAD's, etc. Tables can be re-formatted, compressed, scrambled, transformed, and otherwise altered while still retaining the same function and data. The data may be encoded, combined, or otherwise altered before and after storage. Logical rows of ALU dedicated memory 98 may be physical rows for an array processor.

The functional and computational blocks can be implemented in a variety of ways, such as by firmware routines in a digital-signal processor (DSP) chip, or in logic in a logic array chip, or as software routines executed by a processor, or a combination of techniques. The blocks can be partitioned in many different ways. A programmable register can allow calculations to be disabled, or allow for different threshold values or equations to be used. Additional dividers, multipliers, inverters, etc. could be added to achieve the same or similar results. Active-low rather than active-high signals may be used, and various encodings can be substituted. Several points in each of K directions can be processed at each step.

Other video formats, frame sizes, and block sizes could be supported. Many other functional blocks can exist in a complex MPEG decoder, and pipelining logic and staging registers may also be present. Various pipelining registers can be added. Different versions of the MPEG or other compression standards could be supported. Rather than store X,Y coordinates, motion vector tables 30 could store other kinds of coordinates, such as polar coordinates, displacements, etc.

Various search strategies may be coded into motion vector tables 30. Below is a pseudo-code example of another search strategy:

```
MV_tables[ ] = {
    //search step = 0; first candidate index = 0
    //start point candidates MVs will be stored over some/all of
the 8 values below
        (0,0), (0,0), (0,0), (0,0), (0,1), (0,-1), (-1,0), (0,1),
```

```
    //Sparse 6 stages:
    //search step = 1. first candidate index = 8
    (3,1), (3,-1), (1,-2), (-1,-2), (-3,-1), (-3,1), (-1,2), (1,2),
        // search step = 2. first candidate index = 16
    (6,2), (6,-2), (3,-5), (-3,-5), (-6,-2), (-6,2), (-3,5), (3,5),
        //3,24
    (10,2), (10,-2), (3,-8), (-3,-8), (-10,-2), (-10,2), (-3,8), (3,8),
        //4,32
    (11,5), (11,-5), (7,-8), (-7,-8), (-11,-5), (-11,5), (-7,8), (7,8),
        //5,40
    (15,2), (15,-2), (5,-11), (-5,-11), (-15,-2), (-15,2), (-5,11),
    (5,11),
        //6,48
    (14,7), (14,-7), (10,-11), (-10,-11), (-14,-7), (-14,7),
    (-10,11), (10,11),
        //Dense - Full 5×5
        //7,56
    (1,0), (1,-1), (0,-1), (-1,-1), (-1,0), (-1,1), (0,1), (1,1),
        //8,64
    (2,0), (2,-2), (0,-2), (-2,-2), (-2,0), (-2,2), (0,2), (2,2),
        //9,72
    (2,1), (2,-1), (1,-2), (-1,-2), (-2,-1), (-2,1), (-1,2), (1,2),
        // Dense extension of Full 5×5
        //10,80
    (3,1), (3,0), (3,-1), (0,-3), (-3,-1), (-3,0), (-3,1), (0,3)
    };
};
```

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include compressed video files, reports or other machine-generated displays on display devices such as computer monitors, projection devices, audio-generating devices, and related media devices, and may include hardcopy printouts that are also machine-generated. Computer control of other machines is another tangible result. The memory devices are physical devices such as DRAM, SRAM, magnetic memory, etc. and require a machine to read the data, which is stored in a machine-readable format that is not readable by a human being without the use of a machine.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A parallel motion-estimation search engine comprising:
a plurality of parallel processors, each parallel processor searching a search path for a best path difference value by calculating a sequence of current difference values, each current difference value being a composite difference of pixel values between a current block of pixels in a current frame and a reference block of pixels in a reference frame, the current frame and the reference frame being frames in a sequence of frames in a video stream, wherein the current block and the reference block differ in relative location within a superimposed frame by a motion vector;
a parallel-processor dedicated memory, coupled to the plurality of parallel processors, storing a plurality of rows, each row for storing search data for a parallel processor in the plurality of parallel processors, wherein each row stores a current difference value and a best path difference value and a threshold for a parallel processor;
wherein each parallel processor in the plurality of parallel processors compares the current difference value to the best path difference value and over-writes the best path difference value with the current difference value when the current difference value represents a better match of the current block to the reference block than the best path difference value;
a motion vector table storing a plurality of search paths, for a plurality of search-levels, each search path being a sequence of coordinates, the plurality of search paths stored in the motion vector table identifying a search strategy;
a control processor that activates the plurality of parallel processors to execute a parallel search of the plurality of search paths for one search-level, the plurality of parallel processors generating a plurality of best path difference values stored in the parallel-processor dedicated memory for the plurality of search paths for a current search-level in the motion vector table; and
a level terminator, coupled to the parallel-processor dedicated memory, that compares the best path difference value to the threshold in each row of the parallel-processor dedicated memory and generating a threshold count of a number of rows having best path difference values meeting the threshold;
the control processor terminating the parallel search of the current search-level in response to the threshold count exceeding a target count, the control processor locating a best coordinate in the motion vector table that corresponds to a net best path difference value that is a best difference value among all best path difference values in the parallel-processor dedicated memory;
the control processor shifting a search center to the best coordinate and activating the plurality of parallel processors to execute another parallel search of the plurality of search paths for a following search-level stored in the motion vector table;
the control processor generating a final motion vector by combining the best coordinate generated from multiple search-levels,
whereby the final motion vector is generated by the plurality of parallel processors searching search paths in parallel that are defined by the motion vector table.

2. The parallel motion-estimation search engine of claim 1 wherein the motion vector table comprises a first level and a second level, the first level storing coordinates for points in search paths that cover a large search area, the second level storing coordinates for points in search paths that cover a reduced search area that is a smaller area than the large search area, whereby search areas are reduced for successive search-levels in the motion vector table.

3. The parallel motion-estimation search engine of claim 2 wherein each row in the parallel-processor dedicated memory further stores a current index and a best index, the current index pointing to a current coordinate in the motion vector table that the parallel processor generated the current difference value for, the best index pointing to a best coordinate in the motion vector table that the parallel processor generated the best path difference value for, wherein each parallel processor in the plurality of parallel processors over-writes the best index with the current index when the current difference value represents a better match of the current block to the reference block than the best path difference value, whereby indexes in the parallel-processor dedicated memory locate coordinates in the motion vector table.

4. The parallel motion-estimation search engine of claim 3 wherein rows in the parallel-processor dedicated memory are stored for a full-size block of pixels, four quarter-size blocks of pixels, and for sixteen one-sixteenth-size blocks of pixels for each parallel processor;

wherein each parallel processor generates current difference values for twenty-one blocks for each coordinate in the search path, whereby full-size blocks of pixels are partitioned into smaller blocks.

5. The parallel motion-estimation search engine of claim 4 wherein the full-size block of pixels is partitioned only for a last search-level, wherein a first search-level ignores current difference values for quarter-size blocks of pixels and for one-sixteenth-size blocks of pixels;

wherein the current difference value is a sum-of-the-absolute difference (SAD) of pixels in the current block and in the reference block.

6. The parallel motion-estimation search engine of claim 1 further comprising:

a video encoder, coupled to receive the final motion vector, the video encoder replacing the current block of pixels in the current frame with the final motion vector to compress the video stream to generate a compressed video stream representing the current frame and the reference frame, whereby the video stream is compressed by replacing the current block of pixels with the final motion vector.

7. The parallel motion-estimation search engine of claim 6 further comprising:

a system memory that stores final motion vectors generated by the control processor for a plurality of block of pixels in the current frame, the system memory also storing pixels for blocks in the current frame;

wherein the video encoder reads the final motion vector from the system memory, and replaces pixels with the final motion vector for the current frame in the system memory;

a picture cache that stores pixels for all blocks in the current frame; and a Direct-Memory-Access (DMA) engine that transfers pixels from the system memory to the picture cache.

8. The parallel motion-estimation search engine of claim 7 wherein the plurality of parallel processors comprises K parallel processors, wherein K is a whole number of at least 8, wherein the plurality of search paths comprise K search paths for each search-level.

9. The parallel motion-estimation search engine of claim 7 wherein the plurality of search paths comprise zigzag paths spreading outward from the search center, the zigzag paths each having multiple points of inflexion.

10. A method for estimating motion vectors of macroblocks in a stream of video frames comprising:

loading a motion vector table with coordinates representing a plurality of K search paths for each search-level, including a sparse search-level and a dense search-level, where at each search-level, each of the K search paths containing a sequence of coordinates spreading outward from a search center for that search-level;

wherein K is a whole number of at least 8;

storing a plurality of rows in a parallel-processor dedicated memory, each row storing a best difference value generated by a processor in a plurality of processors and a threshold value in a machine-readable format;

(A) in parallel for each processor in a plurality of K processors:

reading the best difference value from a row of the parallel-processor dedicated memory, wherein the parallel-processor dedicated memory is a physical memory device;

calculating a current difference value, comparing the current difference value to the best difference value read from the parallel-processor dedicated memory, and replacing the best difference value with the current difference value when the current difference value is less than the best difference value;

wherein the current difference value is calculated as a composite difference of pixel values between a current block of pixels in a current frame and a reference block of pixels in a reference frame, the current frame and the reference frame being frames in a sequence of frames in a video stream, wherein the current block and the reference block differ in location within a frame by a displacement that is a function of a current coordinate from the motion vector table for the current difference value;

comparing the best difference value to the threshold value and setting a counting flag when the best difference value is less than the threshold value;

counting the counting flags for all rows in the parallel-processor dedicated memory to generate a threshold count;

when the threshold count does not exceed a target count, looping to (A) to process in parallel another set of coordinates farther along the plurality of K search paths in the motion vector table;

when the threshold count exceeds the target count and the dense search-level has not yet been processed:

searching all rows of the parallel-processor dedicated memory to locate a minimum best difference value, the minimum best difference value being in a minimum row of the parallel-processor dedicated memory;

generating a next search center from a coordinate that corresponds to the minimum row of the parallel-processor dedicated memory;

storing a next plurality of rows in the parallel-processor dedicated memory for a next search-level, each row storing a best difference value generated by a processor in a plurality of processors and a threshold value for the next search-level;
repeating from (A) for the next search-level using the next search center as the search center;
when the threshold count exceeds the target count and the dense search-level has already been processed:
searching all rows of the parallel-processor dedicated memory to locate a final minimum best difference value, the final minimum best difference value being in a final minimum row of the parallel-processor dedicated memory;
generating a final displacement from a coordinate that corresponds to the final minimum row of the parallel-processor dedicated memory, the final displacement including offsets to search centers used in earlier search-levels; and
using the final displacement as a final motion vector to encode the current block in the current frame;
outputting for transmission a machine-readable compressed video file that has blocks of pixels replaced by motion vectors that indicate relative motion of blocks between frames of a video displayable to a viewer,
whereby parallel processors search the plurality of K search paths in parallel over several search-levels having search paths defined by the motion vector table.

11. The method of claim 10 further comprising:
storing a current index for the current difference value, and storing a best index for the best difference value in the parallel-processor dedicated memory for each of the plurality of K processors;
in parallel in each of K processors, replacing the best index with the current index when the current difference value is less than the best difference value;
reading the best index from a best row of the parallel-processor dedicated memory that has a lowest best difference value of all rows in the parallel-processor dedicated memory, and using the best index read to locate a best coordinate in the motion vector table;
using the best coordinate read from the motion vector table using the best index to generate the final motion vector.

12. The method of claim 11 further comprising:
replacing the current block of pixels in the current frame with the final motion vector to compress the video stream to generate the machine-readable compressed video file representing the current frame and the reference frame,
whereby the video stream is compressed by replacing the current block of pixels with the final motion vector.

13. The method of claim 11 further comprising:
during processing of the dense search-level, partitioning the current block into sub-blocks;
wherein the current block is a 16×16 macroblock and the sub-blocks are four 8×8 blocks each having different final motion vectors;
wherein storing the plurality of rows in a parallel-processor dedicated memory further comprises:
storing an upper-left row, an upper-right row, a lower-left row, and a lower-right row that correspond to an upper-left 8×8 block, an upper-right 8×8 block, a lower-left 8×8 block, and a lower-right 8×8 block split from the 16×16 macroblock,
wherein five rows are stored for each current block for each processor of the plurality of K processors, each row storing a best difference value and a threshold value.

14. The method of claim 11 further comprising:
during processing of the dense search-level, partitioning the current block into two levels of sub-blocks;
wherein the current block is a 16×16 macroblock and the sub-blocks are four 8×8 blocks and sixteen 4×4 blocks each having different final motion vectors;
wherein storing the plurality of rows in a parallel-processor dedicated memory further comprises:
storing 21 rows that correspond to the 16×16 macroblock, four 8×8 blocks, and 16 4×4 blocks;
wherein 21 rows are stored for each current block for each processor of the plurality of K processors, each row storing a best difference value and a threshold value.

15. The method of claim 14 further comprising:
calculating an 8×8 net best difference value by combining best difference values for the four 8×8 blocks from four different rows of the parallel-processor dedicated memory;
calculating a 4×4 net best difference value by combining best difference values for the sixteen 4×4 blocks from sixteen different rows of the parallel-processor dedicated memory; and
selecting as the final minimum best difference value the 4×4 net best difference, the 8×8 net difference, or a 16×16 final minimum best difference value.

16. A parallel motion estimator comprising:
a plurality of Arithmetic-Logic-Unit (ALU) processor means, each ALU processor means for searching a search path for a best path difference value by calculating a current difference value, each current difference value being a composite difference of pixel values between a current block of pixels in a current frame and a reference block of pixels in a reference frame, the current frame and the reference frame being frames in a sequence of frames in a video stream, wherein the current block and the reference block differ in location within a frame by a motion vector;
parallel-processor dedicated memory means, coupled to the plurality of ALU processor means, for storing a plurality of record means, each record means for storing search data for an ALU processor means in the plurality of ALU processor means;
wherein each record means is for storing for an ALU processor means:
a current difference value, and a current index, wherein the current index points to a current coordinate in the motion vector memory means that the ALU processor means generated the current difference value for;
a best path difference value, and a best index, wherein the best index points to a best coordinate in the motion vector memory means that the ALU processor means generated the best path difference value for; and
a threshold;
wherein each ALU processor means in the plurality of ALU processor means compares the current difference value to the best path difference value and over-writes the best path difference value with the current difference value and over-writes the best index with the current index when the current difference value represents a better match of the current block to the reference block than the best path difference value;
motion vector memory means for storing a plurality of search paths for a plurality of search-levels, each search path being a sequence of coordinates, the plurality of search paths stored in the motion vector memory means identifying a search strategy;
control processor means for activating the plurality of ALU processor means to execute a parallel search of the plurality of search paths for one search-level, the plurality of ALU processor means generating a plurality of best path difference values for storing in the parallel-processor dedicated memory means for the plurality of search paths for a current search-level in the motion vector memory means;

level terminator means, coupled to the parallel-processor dedicated memory means, for comparing the best path difference value to the threshold in each record means of the parallel-processor dedicated memory means and generating a threshold count of a number of record means having best path difference values meeting the threshold;

the control processor means also for terminating the parallel search of the current search-level in response to the threshold count exceeding a target count, the control processor means locating a best coordinate in the motion vector memory means that corresponds to a net best path difference value that is a best difference value among all best path difference values in the parallel-processor dedicated memory means;

the control processor means shifting a search center to the best coordinate and activating the plurality of ALU processor means to execute another parallel search of the plurality of search paths for a following search-level stored in the motion vector memory means;

the control processor means also for generating a final motion vector by combining the best coordinate generated from multiple search-levels; and video encoder means, coupled to receive the final motion vector, the video encoder means replacing the current block of pixels in the current frame with the final motion vector to compress the video stream to generate a compressed video stream representing the current frame and the reference frame, whereby the final motion vector is generated by the plurality of ALU processor means searching search paths in parallel that are defined by the motion vector memory means.

17. The parallel motion estimator of claim 16 wherein the motion vector memory means comprises a first level and a second level, the first level storing coordinates for points in search paths that cover a large search area, the second level storing coordinates for points in search paths that cover a reduced search area that is a smaller area than the large search area;

wherein the plurality of search paths comprise zigzag paths spreading outward from the search center, the zigzag paths each having multiple points of inflexion, whereby search areas are reduced for successive search-levels in the motion vector memory means.

18. The parallel motion estimator of claim 16 wherein record means in the parallel-processor dedicated memory means are stored for a full-size block of pixels, four quarter-size blocks of pixels, and for sixteen one-sixteenth-size blocks of pixels for each ALU processor means;

wherein each ALU processor means generates current difference values for twenty-one blocks for each coordinate in the search path, whereby full-size blocks of pixels are partitioned into smaller blocks.

19. The parallel motion estimator of claim 18 further comprising:

system memory means for storing final motion vectors generated by the control processor means for a plurality of block of pixels in the current frame, the system memory means also for storing pixels for blocks in the current frame;

wherein the video encoder means is further for reading the final motion vector from the system memory means, and for replacing pixels with the final motion vector for the current frame in the system memory means;

picture cache means for storing pixels for all blocks in the current frame; and

Direct-Memory means-Access (DMA) means for transferring pixels from the system memory means to the picture cache means.

20. The parallel motion estimator of claim 16 wherein the plurality of ALU processor means comprises K ALU processor means, wherein K is a whole number of at least 128;

wherein the plurality of search paths comprise K search paths for each search-level, wherein the current difference value is a sum-of-the-absolute difference (SAD) of pixel values in the current block and in the reference block.

* * * * *